(12) United States Patent
Duvall et al.

(10) Patent No.: US 10,207,936 B2
(45) Date of Patent: Feb. 19, 2019

(54) ULTRAVIOLET REACTOR WITH PLANAR LIGHT SOURCE

(71) Applicant: Silanna UV Technologies Pte Ltd, Singapore (SG)

(72) Inventors: Steven Duvall, Manly (AU); Norbert Krause, Hawthorne (AU); Christopher Flynn, Cherrybrook (AU); Mark Hiscocks, Riverwood (AU); Matthew Stewart, Salford (GB)

(73) Assignee: Silanna UV Technologies Pte Ltd, Singapore (SG)

( * ) Notice: Subject to any disclaimer, the term of this patent is extended or adjusted under 35 U.S.C. 154(b) by 0 days.

(21) Appl. No.: 15/432,602

(22) Filed: Feb. 14, 2017

(65) Prior Publication Data

US 2017/0240437 A1    Aug. 24, 2017

Related U.S. Application Data

(60) Provisional application No. 62/297,719, filed on Feb. 19, 2016.

(51) Int. Cl.
*C02F 1/32* (2006.01)
*B01J 19/12* (2006.01)

(52) U.S. Cl.
CPC ............ *C02F 1/325* (2013.01); *B01J 19/123* (2013.01); *C02F 2201/326* (2013.01);
(Continued)

(58) Field of Classification Search
CPC ............ C02F 1/325; C02F 2201/3221; C02F 2201/3222; C02F 2201/3226;
(Continued)

(56) References Cited

U.S. PATENT DOCUMENTS 3,948,772 A    4/1976  Ellner
4,293,522 A *  10/1981 Winkler ............... G01N 31/005
                                              204/263
(Continued)

OTHER PUBLICATIONS

Bandla et al., "Impact of UV-C Processing or Raw Cow Milk Treated in a Continuous Flow Couled Tube Ultraviolet Reactor", Agricultural Engineering International, CIGR Journal, 14, Manuscript No. 1943, Aug. 15, 2011.
(Continued)

*Primary Examiner* — Nicole Ippolito
*Assistant Examiner* — Hanway Chang
(74) *Attorney, Agent, or Firm* — The Mueller Law Office, P.C.

(57) ABSTRACT

Various ultraviolet (UV) reactors and their methods of fabrication are disclosed. One exemplary process comprises forming a set of parallel channels in a slab of ultraviolet transparent material. The process also comprises providing a reactor substrate with an input manifold and an output manifold. The process also comprises joining the slab of ultraviolet transparent material and the reactor substrate. The input manifold, output manifold, and set of parallel channels are in fluid communication after the joining step. The process also comprises providing a planar ultraviolet light source isolated from the set of parallel channels by the shaped slab of ultraviolet-transparent material. The set of parallel channels and a defining plane of the planar ultraviolet light source are parallel in the assembled ultraviolet reactor.

12 Claims, 16 Drawing Sheets

(52) U.S. Cl.
CPC .................. *C02F 2201/328* (2013.01); *C02F 2201/3221* (2013.01); *C02F 2201/3222* (2013.01); *C02F 2201/3226* (2013.01); *C02F 2301/024* (2013.01)

(58) Field of Classification Search
CPC .......... C02F 2201/326; C02F 2201/328; C02F 2301/024; B01J 19/123
USPC ..................................... 250/428, 423 R, 435
See application file for complete search history.

(56) References Cited

U.S. PATENT DOCUMENTS

| | | | |
|---|---|---|---|
| 5,017,284 A | | 5/1991 | Miler et al. |
| 5,353,114 A | | 10/1994 | Hansen |
| 5,449,466 A | * | 9/1995 | Peebles, III ........... B01J 19/123 126/674 |
| 5,494,576 A | | 2/1996 | Hoppe et al. |
| 5,626,768 A | | 5/1997 | Ressler et al. |
| 6,083,387 A | | 7/2000 | LeBlanc et al. |
| 6,201,355 B1 | | 3/2001 | Morgan et al. |
| 6,447,720 B1 | | 9/2002 | Horton et al. |
| 6,447,721 B1 | | 9/2002 | Horton et al. |
| 7,119,451 B2 | | 10/2006 | Baarman et al. |
| 7,361,904 B2 | | 4/2008 | Cassassuce et al. |
| 7,544,291 B2 | | 6/2009 | Ehlers |
| 7,740,754 B2 | | 6/2010 | Fite |
| 7,767,158 B2 | | 8/2010 | Kawai et al. |
| 7,812,946 B1 | | 10/2010 | Killinger et al. |
| 8,129,696 B2 | | 3/2012 | Miller |
| 8,840,845 B2 | | 9/2014 | Soler et al. |
| 8,900,027 B2 | | 12/2014 | Bulson et al. |
| 8,961,890 B2 | | 2/2015 | Kim |
| 9,045,358 B2 | | 6/2015 | Greuel |
| 9,179,703 B2 | | 11/2015 | Shur et al. |
| 2005/0183996 A1 | | 8/2005 | Zemel et al. |
| 2005/0189497 A1 | | 9/2005 | Panico et al. |
| 2005/0189770 A1 | | 9/2005 | Baarman et al. |
| 2008/0067414 A1 | | 3/2008 | Cassassuce et al. |
| 2009/0084734 A1 | | 4/2009 | Yencho |
| 2009/0145855 A1 | | 6/2009 | Day et al. |
| 2010/0224562 A1 | | 9/2010 | Rolchigo et al. |
| 2010/0314551 A1 | | 12/2010 | Bettles et al. |
| 2011/0278467 A1 | | 11/2011 | Tanaka |
| 2012/0006995 A1 | | 1/2012 | Greuel |
| 2012/0202048 A1 | | 8/2012 | Mason et al. |
| 2014/0263090 A1 | | 9/2014 | Yencho |
| 2015/0053624 A1 | | 2/2015 | Maiden |
| 2015/0114912 A1 | | 4/2015 | Taghipour |
| 2015/0262779 A1 | | 9/2015 | Eaton |

OTHER PUBLICATIONS

Clauss et al., Ultraviolet disinfection with 222 nm wavelength-new options to inactivate UV-resistant pathogens, Sustainable animal husbandry: prevention is better than cure, vol. 2. Proceedings of the 14th International Congress of the International Society for Animal Hygiene (ISAH), Vechta, Germany, Jul. 19-23, 2009.. Tribun EU, 2009.

Crawford et al., "Final LDRD Report: Ultraviolet Water Purification Systems for Rural Environments and Mobile Applications", Sandia Report, Sandia National Laboratories, SAND2005-7245, Nov. 2005.

Dartnell et al., "Degredation of Microbial Flurescence Biosignatures by Solar Ultraviolet Radiation on Mars", International Journal of Astrobiology, Jun. 24, 2013.

Eden Park, Company Website, News Page, Available at: http://edenpark.com/news-2/, Accessed on Jan. 28, 2016.

Gaska et al., "Deep UV LEDs for Public Health Applications", International Journal of High Speed Electronics and Systems, vol. 23, Nos. 3&4, Sep. 2014.

Ghaly et al., "Reduction of Microbial Population in Cheese Whey by UV in Single and Series Conventional Reactors", American Journal of Biochemistry and Biotechnology, 2 (3), pp. 89-96, 2006.

Herring et al, Microplasma Planar Lighting, Eden Park Illumination, 2012, Accessed online Feb. 14, 2017: http://edenpark.com/wp-content/uploads/Microplasma_Planar_Lighting-by_Eden_Park_Illumination.pdf.

Kneissl et al., "Development of UV-LED Disinfection", Techneau Report, Feb. 2010.

Konev et al., "Luminescence Method for the Determination of Protein in Milk", Biophysics No. 8, pp. 260-268, Apr. 30, 1962.

Legrini et al., "Photochemical Processes for Water Treatment", Chemical Reviews, vol. 93, No. 2, pp. 671-698, Jan. 1993.

Matak, "Effects of UV Irradiation on the Reduction of Bacterial Pathogens and Chemical Indicators of Milk", Dissertation, Virginia Polytechnic Institute and State University, Nov. 22, 2004.

Melebari, "Development of Ultraviolet Tyalor Couette Reactor to Apply Non-Thermal Pasteurization on Milk", Dissertation, The University of Guelph, Oct. 2012.

Reinemann et al., "New Methods for UV Treatment of Milk for Improved Food Safety and Product Quality", ASABE Meeting Presentation, Paper No. 066088, Jul. 9-13, 2006.

Skiba et al., "Sterilization of Milk by Ultrasonics", 8th International Siberian Workshop and Tutorials, Session V, Novosibirsk State Technical University, Jul. 1-5, 2007.

* cited by examiner

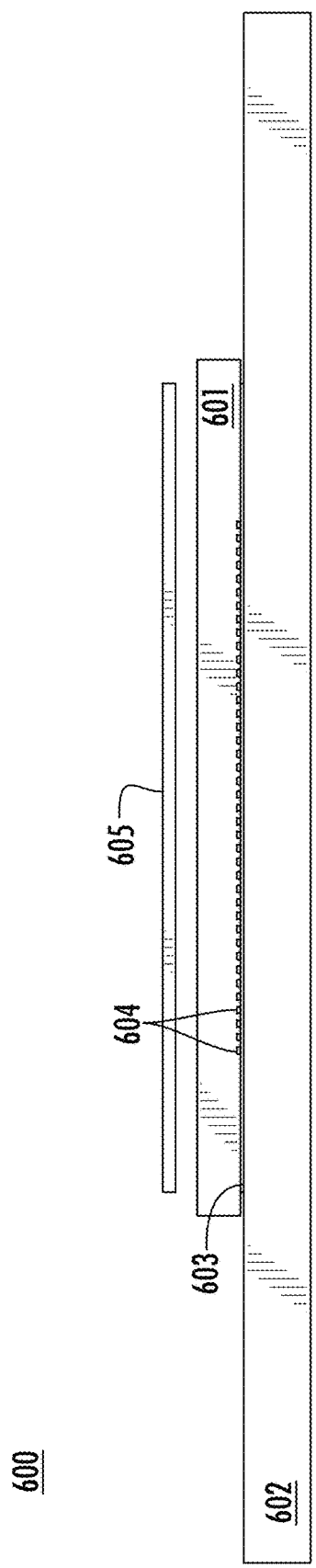

_US 10,207,936 B2_

ULTRAVIOLET REACTOR WITH PLANAR LIGHT SOURCE

RELATED APPLICATIONS

This application claims priority from U.S. Provisional Patent Application No. 62/297,719, filed on Feb. 19, 2016 and entitled "Ultraviolet Reactor with Planar Light Source," which is hereby incorporated by reference for all purposes.

BACKGROUND

Ultraviolet (UV) light is used to purify fluids due to its bactericidal effects and ability to inactivate viruses and enzymes. In particular, as UV light is absorbed, it causes disruption in the transcription and replication of DNA which ultimately kills the exposed microorganism. The UV region of the electromagnetic spectrum ranges from 100 to 400 nm. UV light in the range of 100-280 nm is the germicidal range that serves to inactivate enzymes, bacteria and viruses. The maximum germicidal effect is estimated to be in the range of 250-270 nm. Aside from the wavelength of light, the exposure requirement (energy received by a surface per unit area), is also a consideration that needs to be taken into account. After a certain point, the germicidal effect of any given exposure will realize diminishing returns, but an insufficient level of exposure can result in a situation in which malevolent microorganisms are merely wounded, allowing them to recover and replicate in a fluid that was thought to have been purified.

There are two popular species of ultraviolet reactor configurations. The first popular UV reactor configuration in the related art involves a cylindrical flow tube, through which the liquid flows, which is surrounded by a source of UV light that bombards the liquid from 360° along the length of the cylinder. The cylindrical flow tube is made of ultraviolet-transparent ("UV transparent") material and serves to isolate the liquid from the source of UV light while allowing the UV light to pass through to the liquid. The source of UV light in these situations is often a set of tubular UV lamps distributed around the circumference of the cylindrical flow tube. The second popular UV reactor configuration is the opposite of the first. In the second configuration, the light is on the "inside" in an isolated cylinder that shares the same main axis as the flow tube. As a result, the fluid flows around the UV light source and is bombarded along the length of the flow tube from within.

SUMMARY

In some embodiments, an ultraviolet reactor includes a shaped slab of ultraviolet-transparent material, a reactor substrate in contact with the shaped slab, a set of parallel channels and a planar ultraviolet light source. The set of parallel channels is defined by an interface between the shaped slab and reactor substrate. The planar ultraviolet light source is isolated from the set of parallel channels by the shaped slab of ultraviolet-transparent material. The set of parallel channels and a defining plane of the planar ultraviolet light source are parallel.

In some embodiments, a process for fabricating an ultraviolet reactor includes forming a set of parallel channels in a slab of ultraviolet transparent material, and providing a reactor substrate with an input manifold and an output manifold. The process also includes joining the slab of ultraviolet-transparent material and the reactor substrate, where the input manifold, output manifold, and set of parallel channels are in fluid communication after the joining step. A planar ultraviolet light source, which is isolated from the set of parallel channels by the shaped slab of ultraviolet-transparent material, is provided. The set of parallel channels and a defining plane of the planar ultraviolet light source are parallel in the assembled ultraviolet reactor.

In some embodiments, an ultraviolet reactor includes a shaped slab of ultraviolet-transparent material, a reactor substrate, and a patterned flexible insert positioned between, and in contact with, the shaped slab and reactor substrate. The reactor also includes a set of parallel channels defined by the interfaces between the shaped slab, the patterned flexible insert, and the reactor substrate. A planar ultraviolet light source is included, which is isolated from the set of parallel channels by the shaped slab of ultraviolet-transparent material. The set of parallel channels and a defining plane of the planar ultraviolet light source are parallel.

In some embodiments, an ultraviolet reactor includes a shaped slab of ultraviolet-transparent material, a reactor substrate, and a flexible insert positioned between, and in contact with, the shaped slab and reactor substrate. A set of parallel channels is defined by the interface between the flexible insert and shaped slab. A planar ultraviolet light source is isolated from the set of parallel channels by the shaped slab of ultraviolet-transparent material. The set of parallel channels and a defining plane of the planar ultraviolet light source are parallel. The interface between the shaped slab and flexible insert consists of a single flat flexible insert surface and excavated regions of the shaped slab of ultraviolet-transparent material. The excavated regions solely define an ultraviolet exposure area of the set of parallel channels.

BRIEF DESCRIPTION OF THE DRAWINGS

FIGS. 6A-6B illustrate an exploded perspective side view and an exploded side view, respectively, of a UV reactor in accordance with embodiments of the present disclosure.

DETAILED DESCRIPTION

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

A UV reactor comprises a rigid body with an inlet, an outlet, and one or more interior compartments to enable liquids to flow through the reactor body. The rigid body can include a slab of UV-transparent material and a reactor substrate. As the liquids flow through the interior compartments they are exposed to UV light from a UV light source to purify the fluid. The interior compartments can be at least one set of parallel channels. In other approaches, the interior compartment can be a single linear or meandering channel. The UV light source is a planar UV light source. The defining plane of the UV light source is parallel to at least one set of parallel channels. This use of a planar UV light source simplifies the design of the reactor body when compared to related approaches. Furthermore, in specific approaches a slab of UV-transparent material is generally easier to manage than a tube or cylinder of such material. In addition, in certain approaches turbulent flow is induced and maintained in the liquid via the use of reactor configurations with multiple channels. As a result, the liquid in each channel is exposed on multiple sides as it moves through the reactor body and each portion of the liquid has a higher probability of being directly exposed to UV light as compared to a flat plane of liquid that is exposed to a UV light source. UV reactors in accordance with this disclosure are inexpensive to fabricate and operate, efficiently expose the liquid on which they operate to UV light, and can be easily disassembled for cleaning and maintenance.

Figure 1:
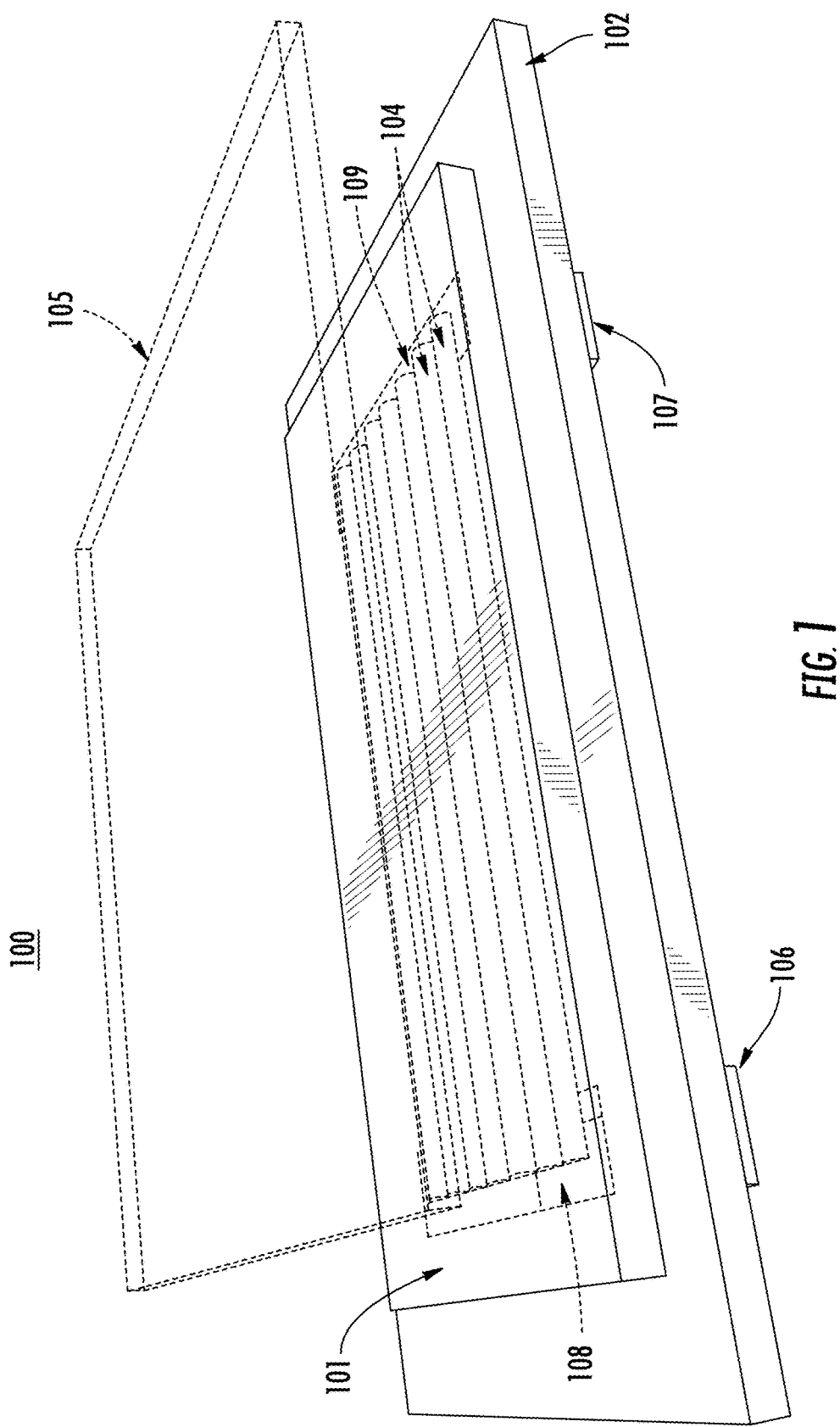
FIG. 1 illustrates an exploded isometric view of an ultraviolet (UV) reactor in accordance with embodiments of the present disclosure.
Figure 2A:
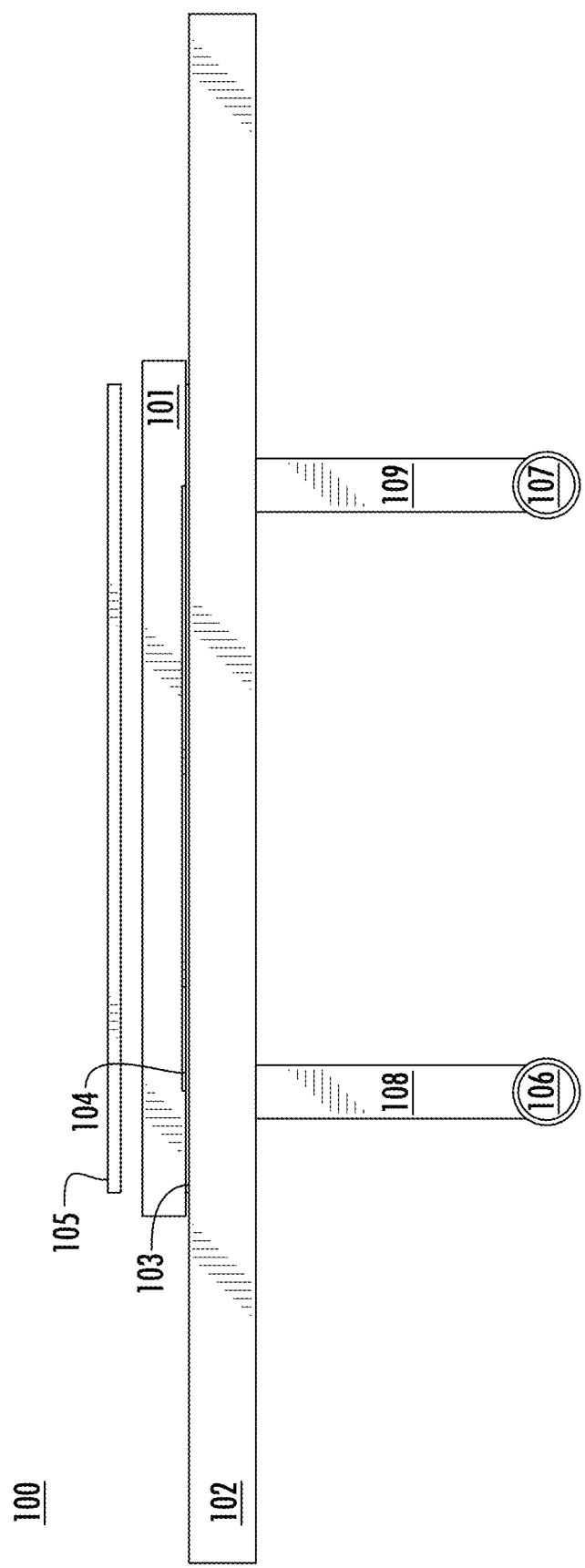
FIGS. 2A and 2B illustrate front and side views, respectively of a UV reactor in accordance with embodiments of the present disclosure.
Figure 2B:
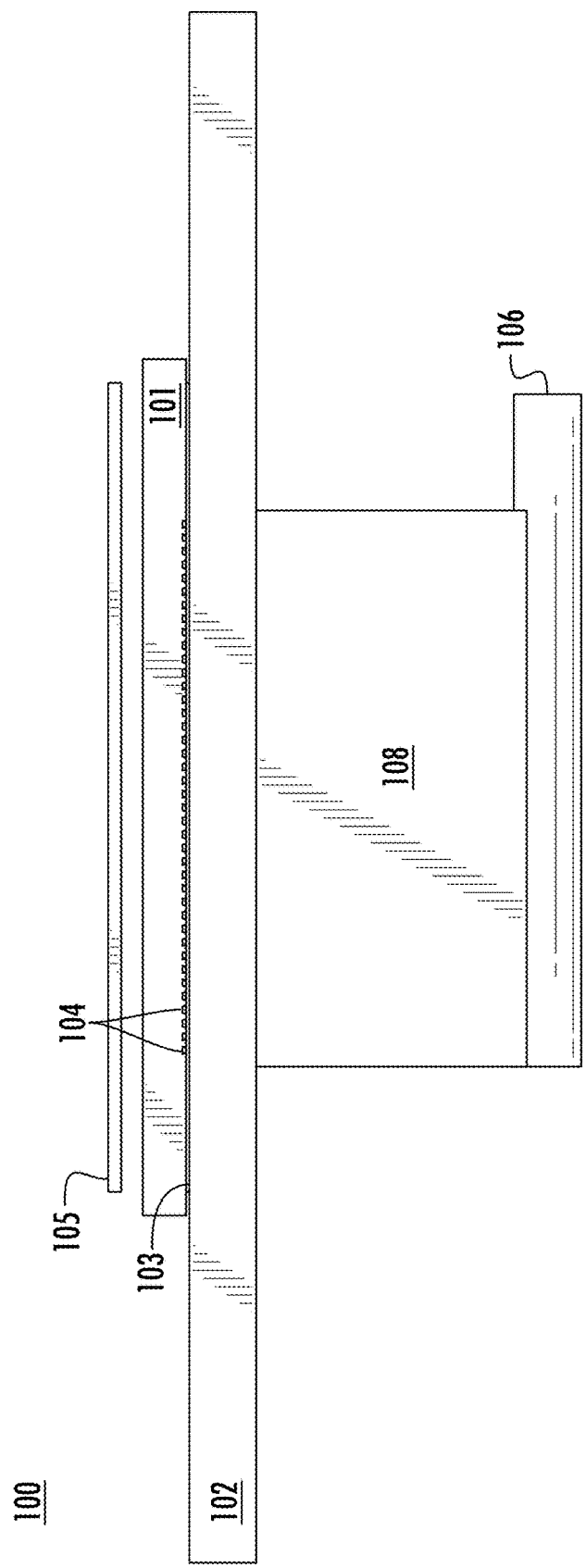
Figure 3:
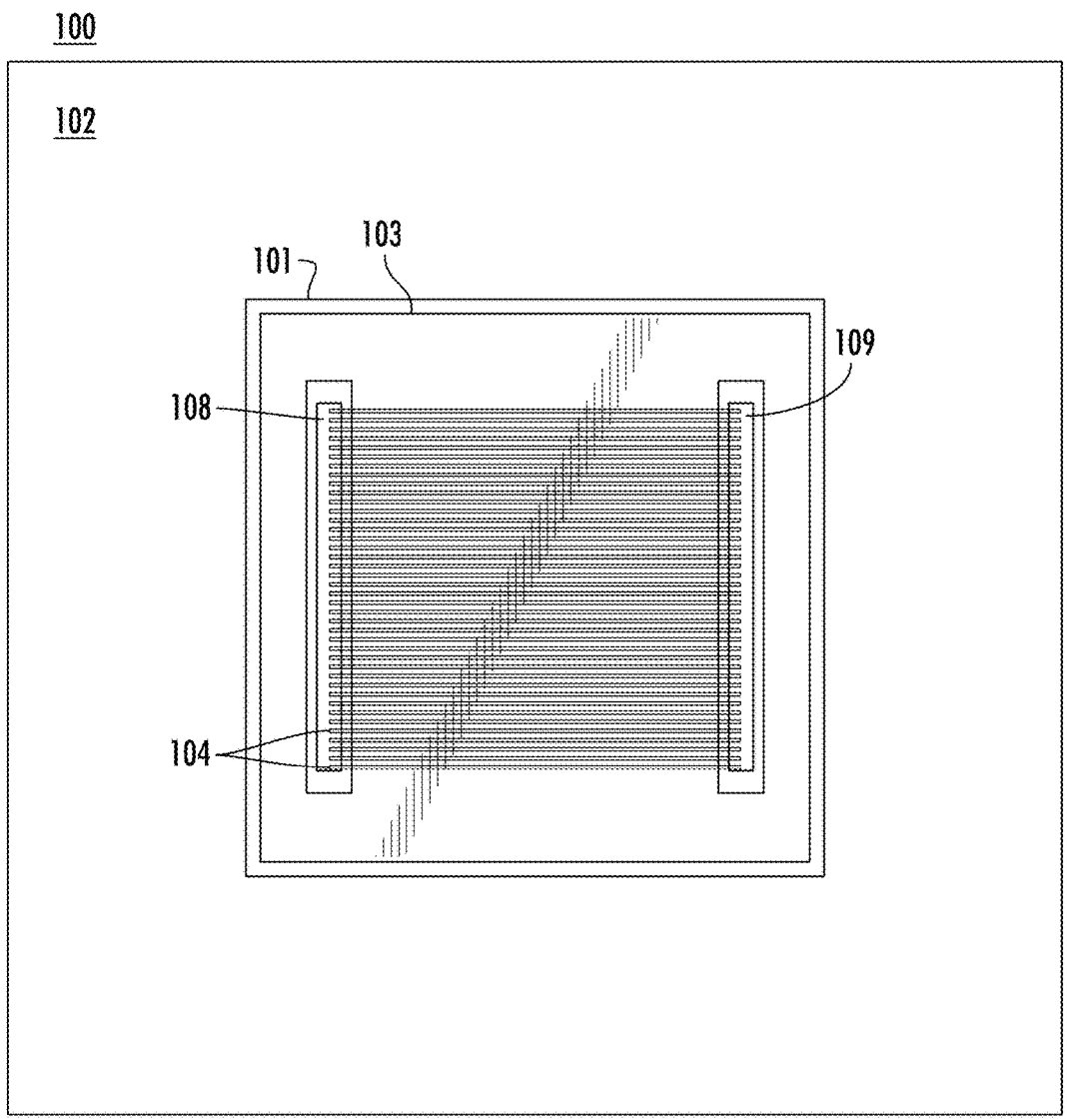
FIG. 3 illustrates a top view of the UV reactor in FIGS. 2A-2B, as seen from the perspective of the UV light source.

FIGS. 1-3 provide exploded views of embodiments of a UV reactor 100 from different angles. The UV reactor includes shaped slab of UV-transparent material 101, reactor substrate 102 and flexible insert 103. UV reactor 100 also includes channels 104, UV light source 105, inlet 106, outlet 107, and manifolds 108 and 109. The flexible insert 103 is disposed between the UV-transparent material 101 and the reactor substrate 102, as can be seen in the front view of FIG. 2A and side view of FIG. 2B. The set of parallel channels 104, best seen in FIG. 1 and FIG. 3, are defined by excavated portions of UV transparent material 101 and the flexible insert 103. The embodiment of FIG. 1 illustrates semi-circular channels, while the embodiments of FIGS. 2A-2B and FIG. 3 illustrate rectangular channels. The channels 104 serve as the main exposure channel for the UV reactor. UV reactor 100 also includes planar UV light source 105 which is isolated from channels 104 by shaped slab 101. As illustrated, the set of parallel channels 104 and the defining plane of planar ultraviolet light source 105 are parallel. As a result, the main emission plane of the planar UV light source 105 is evenly directed across the length of parallel channels 104.

In UV reactor 100, the channels 104 are formed in the shaped slab 101. As illustrated, the interface between shaped slab 101 and flexible insert 103 consists of a single flat flexible insert surface and excavated regions of shaped slab 101. As a result, those excavated regions solely define a UV exposure area of the set of parallel channels 104. This UV exposure area is more clearly visible in FIG. 2B which shows an embodiment with rectangular openings to channels 104. However, the channels can also be semicircular in cross-section (FIG. 1), triangular, trapezoidal, semielliptical, square, or an amalgamated combination of these geometric shapes. The profile of the channels can also vary across the channel's length. The shape of the channels may be selected to maximize the turbulence of the fluid through the channels and effective exposure area of the set of channels overall. However, the shape of the channel may also be selected to minimize the cost of manufacturing the overall reactor. Effective exposure area is different than exposure area in that sharply angled exposure to light from planar UV light source 105 is not as effective as exposure to direct light.

Figure 4A:
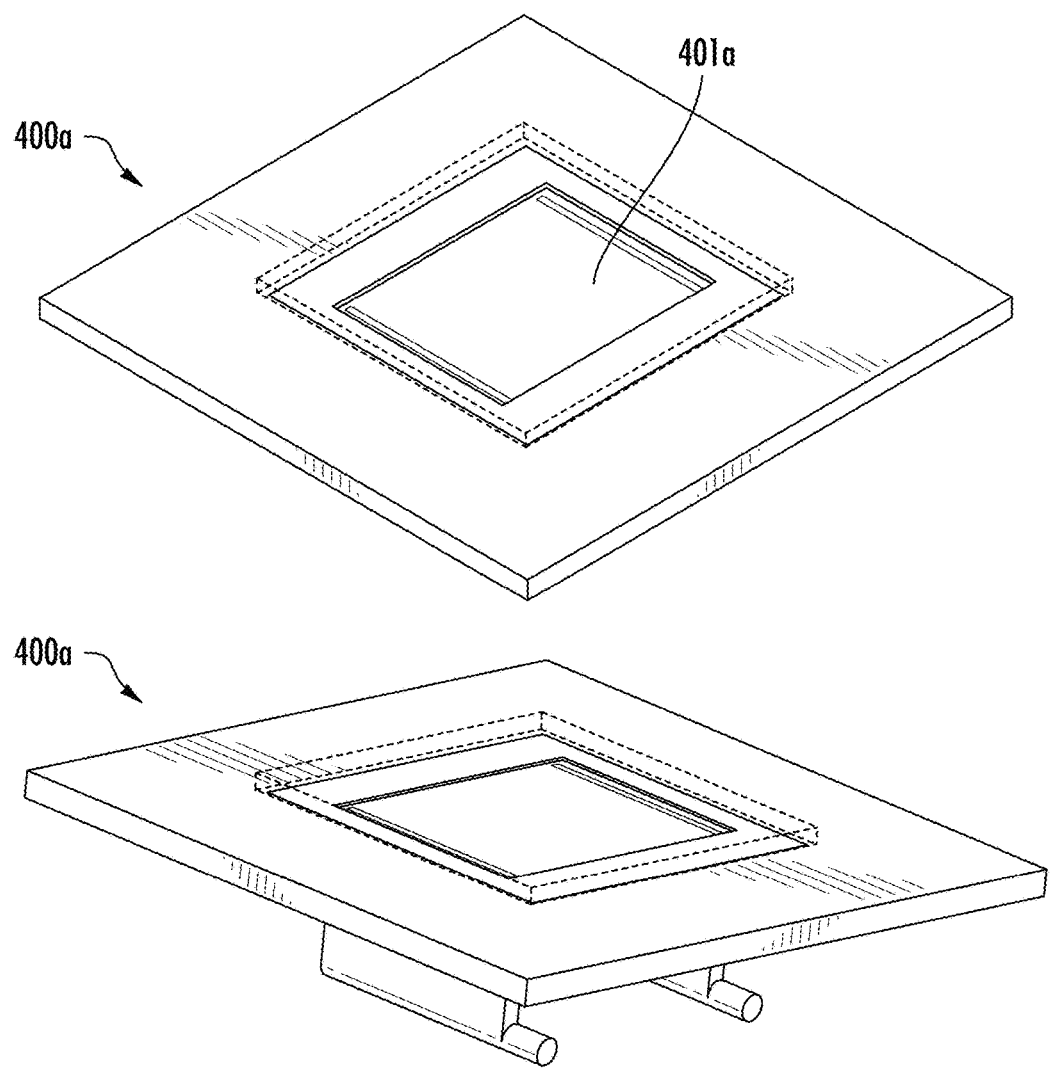
FIGS. 4A-4B illustrate multiple angled views of UV reactors in accordance with embodiments of the present disclosure.
Figure 4B:
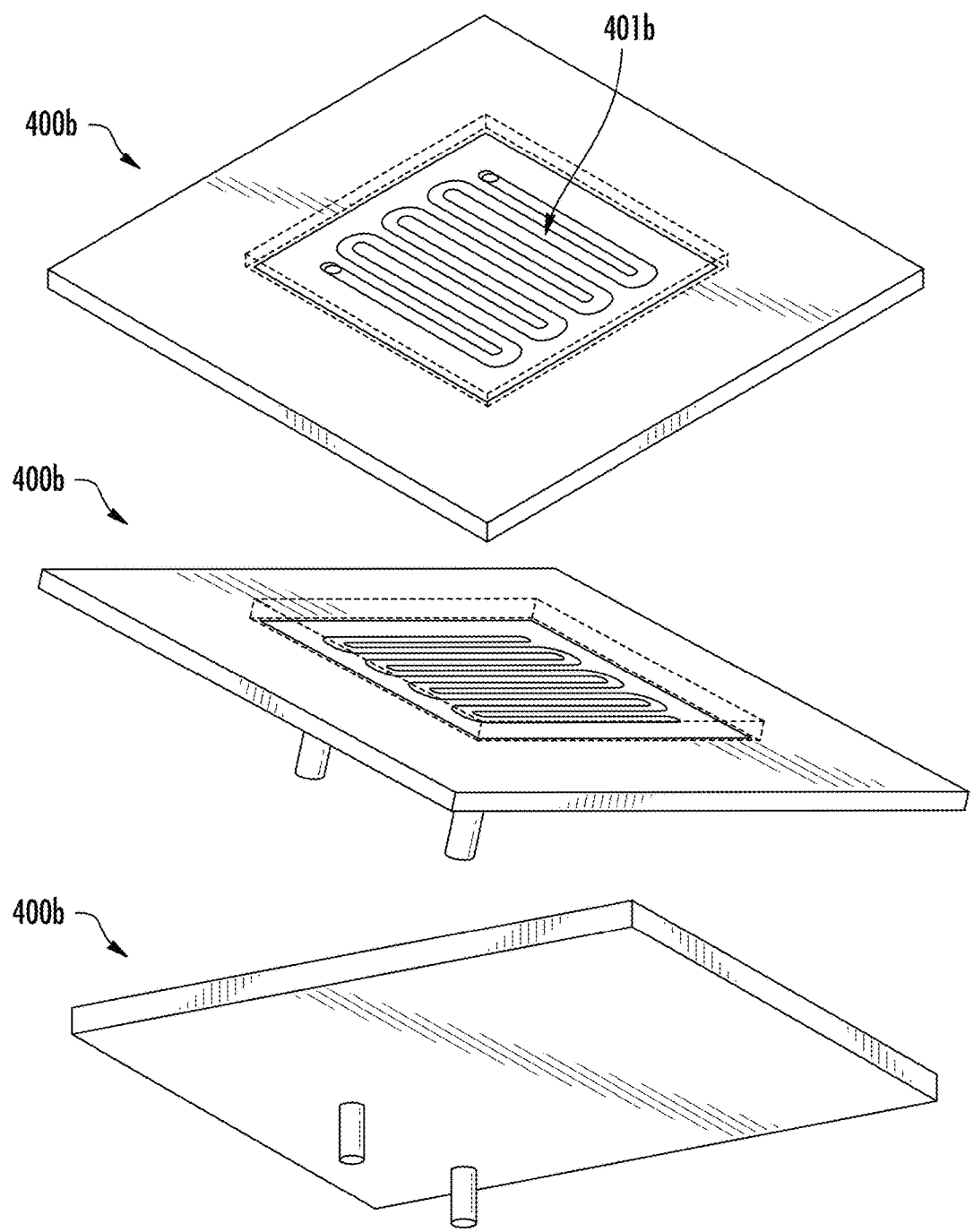

FIG. 4A illustrates two angled views of a UV reactor 400a that has a single channel 401a rather than a set of parallel channels. In FIG. 4A the single channel 401a is illustrated with a width approximately equivalent to several of the parallel channels 104 of FIG. 3. Other embodiments are possible, where the channel of the UV reactors of the present disclosure may be, for example, a linear channel, or a non-linear meandering channel. FIG. 4B illustrates three angled views of a UV reactor 400b with a meandering channel 401b. One of the benefits of a meandering channel is that a volume of fluid spends a longer period of time traveling from the inlet of the reactor to the outlet of the reactor than it would if it were to travel a direct route. As a result, the liquid is exposed to a higher UV dose. Although UV reactor 400b is illustrated as having a single meandering channel, multiple meandering channels may be implemented on the same reactor substrate. In the case of a meandering channel, the inlet and outlet of the reactor can be located on a single end of the reactor substrate rather than on alternative ends.

Figure 5A:
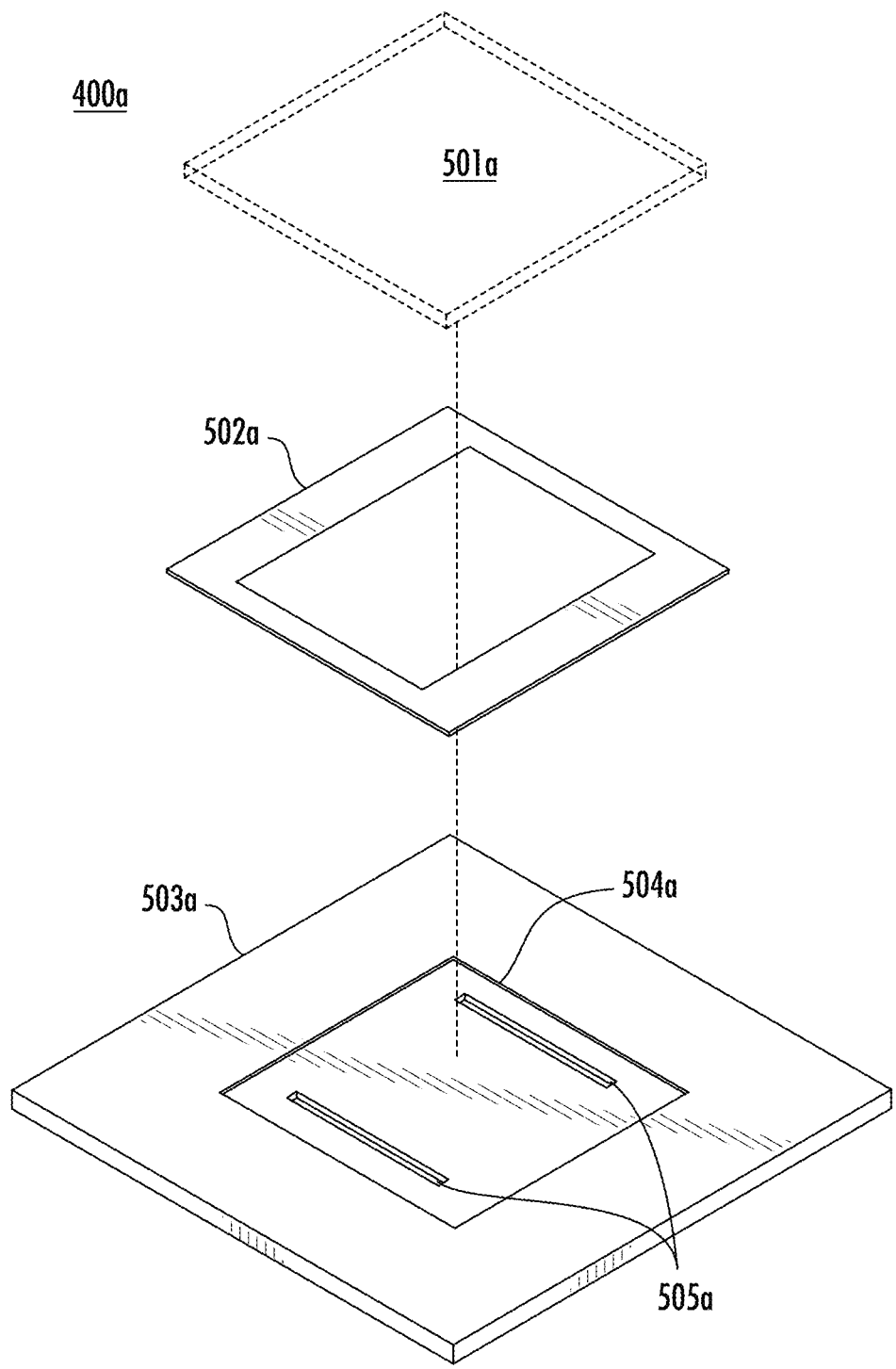
FIGS. 5A-5B illustrate exploded views of the UV reactors in FIGS. 4A-4B.
Figure 5B:
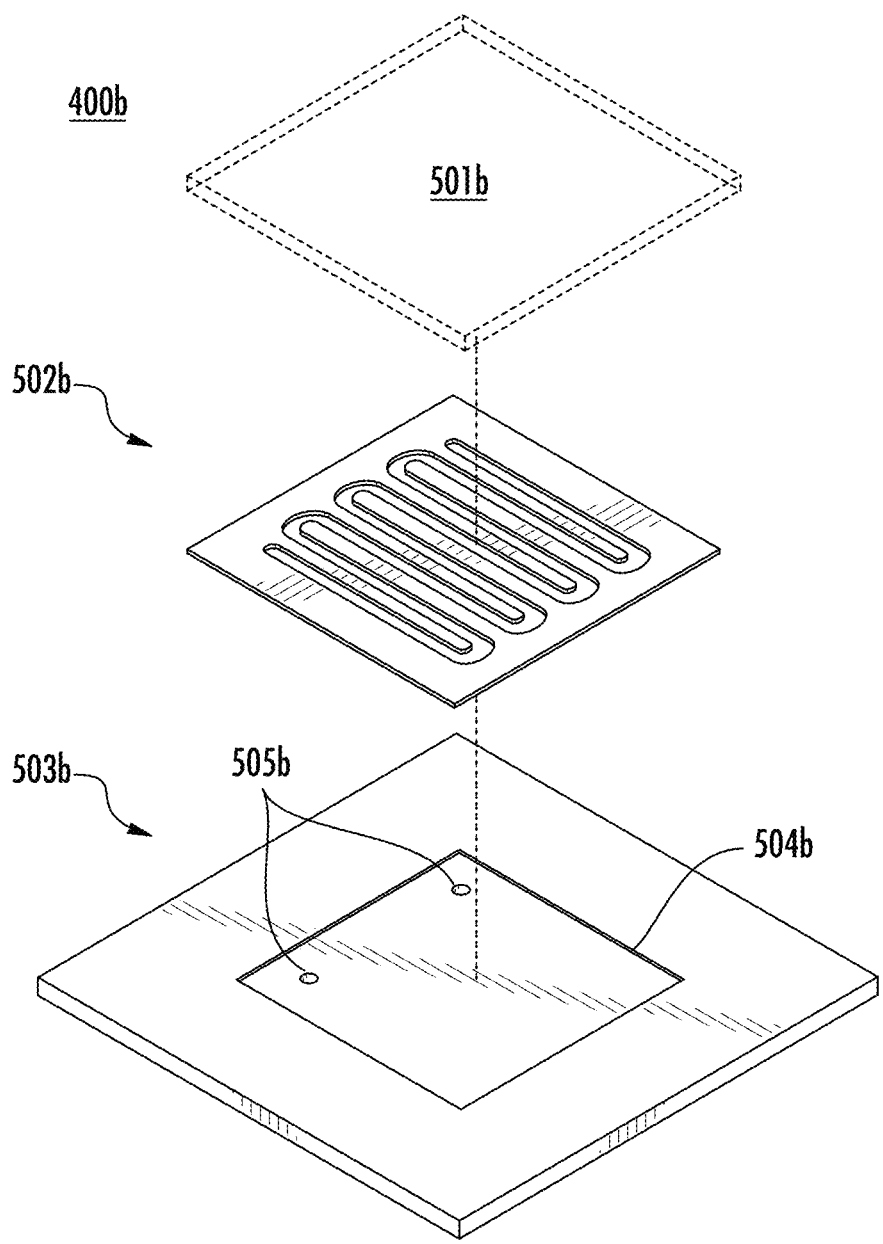

Aside from having different shapes, the channels can alternatively be formed in different layers of the reactor. For example, the channels could be formed in the material of the reactor substrate either in combination with excavated portions of UV-transparent material or alone. In other words, the channels can be defined by excavated portions of both the reactor substrate 102 and the UV-transparent material 101 alone or in combination. Furthermore, the flexible insert 103 may be placed between the UV-transparent material and the reactor substrate and the insert may also be used to define the channels. For example, flexible insert 103 may be a silicone rubber insert placed in-between the reactor substrate and the UV-transparent material and guide the liquid from the inlet to the outlet. As illustrated in FIGS. 5A-5B, which show an exploded view of reactors 400a and 400b, channels can be formed in a patterned flexible insert (502a, 502b) and placed between a flat layer of UV transparent material (501*a*, 501*b*) and a flat reactor substrate (503*a*, 503*b*). Reactor substrate 503*a/b* includes a depression (504*a*, 504*b*) for the insert (502*a*, 502*b*) and holes (505*a*, 505*b*) for the channel outlet. As another example, the silicon rubber insert can be flat and the channels can be defined by excavated portions of the UV-transparent material. As another example, multiple parallel channels could be formed in both the flexible insert and UV transparent material while the reactor substrate presented a single flat interface towards the channel inlet and outlet of the reactor.

Liquid can be induced to flow through the UV reactor via a pumping apparatus or by forcing the liquid through the channels using gravity. The UV reactor can be positioned in a way that allows gravity to aid the flow of liquid through the reactor such as by having the set of channels extend in a vertical or downward sloping direction. The size of the channels can be set in accordance with an expected pressure of the liquid flowing therethrough in order to set the amount of time the liquid will be exposed to the UV light.

The flow of liquid can be intermittent or continuous and can also involve the recirculation of fluid that was previously sent through the reactor. In specific approaches, fluid flow through the reactor and light emission from the planar light source will both begin at the same time in response to a single input provided by an operator of the reactor. This input could be a button press on the front panel of a stand-alone reactor. The amount of recirculation and the speed at which the fluid flows through the reactor could also be controlled by an operator such as via buttons and dials on a stand-alone reactor. The light source, fluid flow, or both, could be terminated via another input from the operator, via a timer indicating that a predetermined amount of time had passed, or input from a sensor sensing a given aspect of the reactor.

Sensors can detect various aspects of the system such as the volume of liquid flowing through the reactor through a time interval, the instantaneous efficacy of the UV light source, and the purity of the liquid flowing into or out of the reactor. This sensor data can be used to adjust the operation of the UV reactor. For example, if a sensor detects that the liquid flowing out of the reactor does not meet a certain degree of purity, the flow through the reactor can be halted or slowed, a separate flow path can be opened to recirculate the fluid back through the filter, or an alarm could be raised to allow an operator to adjust the system as desired. As another example, if a sensor detects that fluid is no longer flowing through the reactor, the UV light source could be extinguished to save power. As another example, if a sensor detects that the UV light source has failed, fluid could be prevented from flowing through the reactor. The sensors can include biological sensors used to detect pathogens in the liquid flowing through the reactor and light sensors used to monitor the UV light irradiance. Exemplary sensors are described below with reference to FIGS. 10 and 11.

Figure 6A:
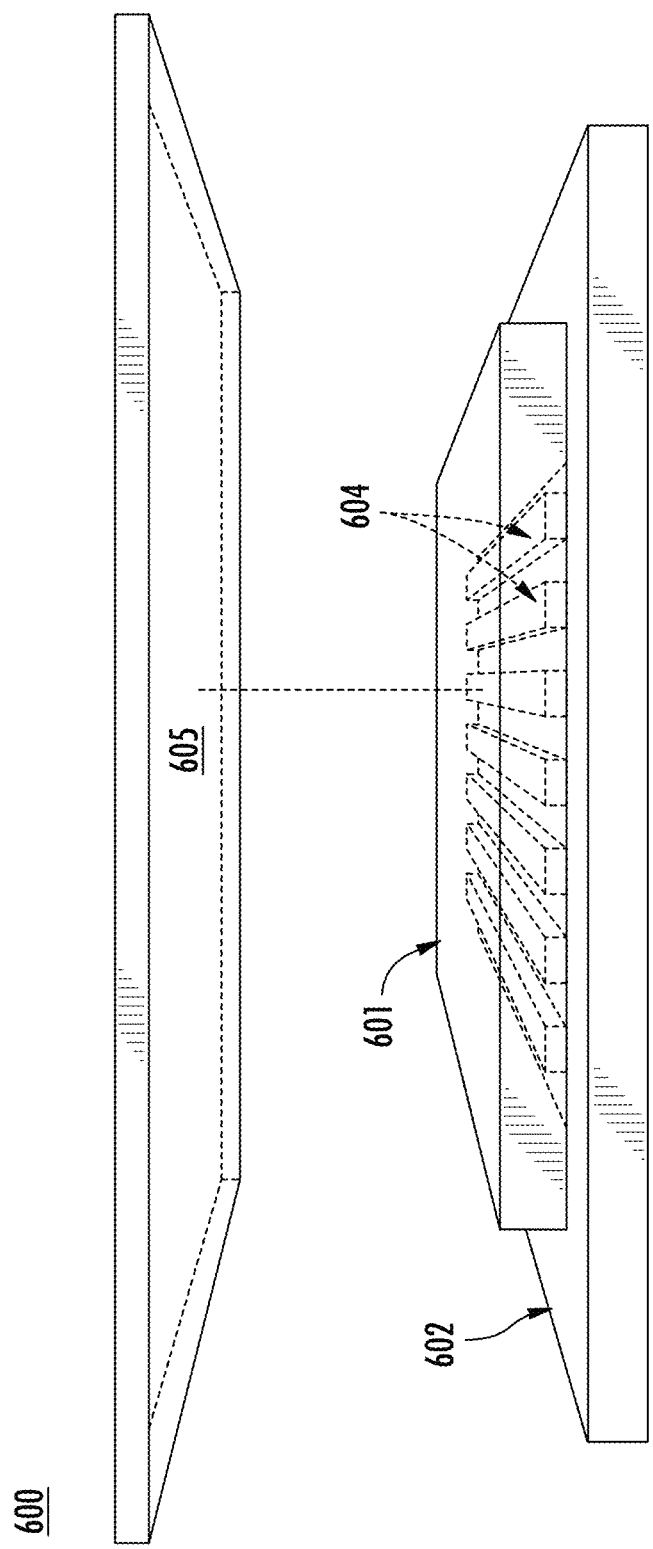
Figure 7:
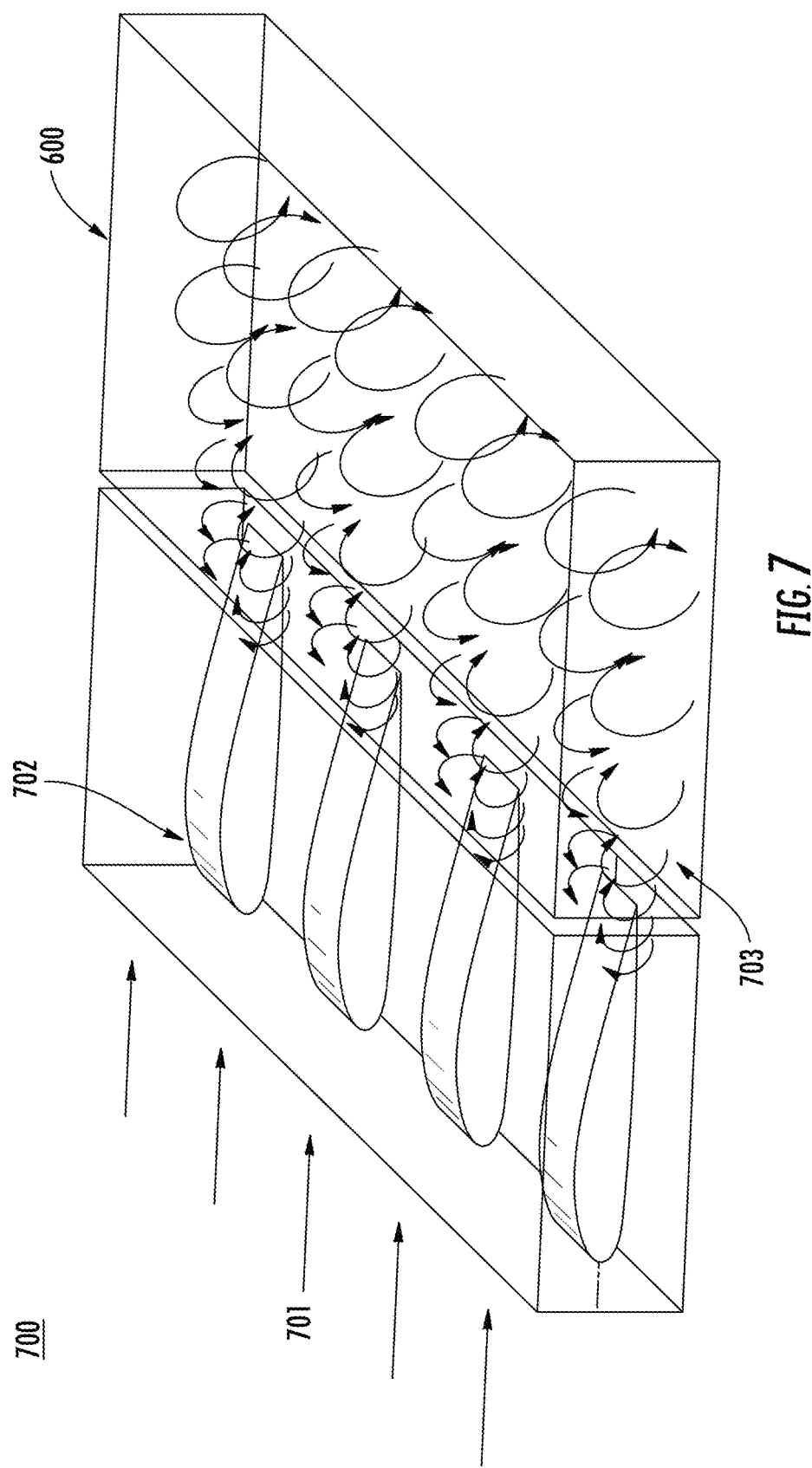
FIG. 7 illustrates a manifold that creates turbulent flow in a liquid that is channeled through a UV reactor in accordance with embodiments of the present disclosure.

FIGS. 6A-6B illustrate another exemplary UV reactor 600 which includes shaped slab of UV-transparent material 601, a reactor substrate 602, a flexible insert 603, a set of parallel channels 604 and a planar UV light source 605. FIG. 6A shows an embodiment with fewer channels 604 than FIG. 6B, illustrating that different arrangements of the channels are possible. The parallel channels 604 are formed to the edge of shaped slab 601 such that the manifold of the UV reactor 600 is not defined by the shaped slab or substrate. Alternatively, the illustrated channels can be set back form the edge of the slab, and a manifold can be formed in the UV-transparent material. Regardless, UV reactor 600 differs from UV reactor 100 in that it is configured to have an inlet and outlet that are in line with the channels. As a result, UV reactor 600 can be augmented with a turbulence-inducing manifold such as in system 700 in FIG. 7. As shown in system 700, fluid flowing along direction 701 can be intercepted by a set of airfoil blades 702 to create turbulent flow in the form of wingtip vortices 703 flowing into reactor body 600. As fluid flows across the airfoil blades, a pressure difference is created between liquid streams flowing on opposing upper and lower surfaces of the blade. At the blade edges, liquid from the high pressure side spills across into the low pressure side, creating the aforementioned wingtip vortices. The vortices from the edges of multiple blades contribute to turbulent flow of liquid through the reactor body. When the flow of liquid through the reactor body changes from laminar to turbulent, a larger volume of the liquid will be exposed to the surface of the channels thereby increasing the overall exposure of the liquid to UV radiation and increasing the efficacy of purification. System 700 is a single example of the manner in which turbulent flow can be induced in the channel, and numerous other exemplary designs exhibit the same feature.

When the flow of liquid through the reactor changes from laminar to turbulent, a larger volume of the liquid will be exposed to the surface of the channels, thereby more evenly exposing the liquid to UV radiation and increasing the efficacy of purification. Turbulent flow through the UV reactors disclosed herein can be created in numerous ways. For example, and with reference to system 700 and UV reactor 100, the overall reactor design can be configured in a way to induce turbulent flow. In UV reactor 100, turbulent flow can be induced by making the liquid flow rate sufficiently high. Turbulent flow is also encouraged as the liquid is forced through the corner created by the inlet manifold to the parallel channels. As the liquid flows from inlet 106 to outlet 107 as shown in FIGS. 1 and 2A, it passes through manifolds 108 and 109 which can disrupt the laminar flow of the fluid and create turbulence. In system 700, which would be inserted into inlet manifold 108, turbulent flow is induced through the use of airfoil blades 702. As another example, the surfaces, profile, and plan view of the channels can be modified to induce turbulence. The interfaces of the channels and manifolds could likewise be modified to induce turbulence. The plan view of the channels could include zigzag paths. The profile of the channels could include a cork screw pattern. The surfaces of the channels and manifolds could also be augmented with features such as various textures or baffles.

In addition to the airfoil blades 702, other obstructions can be placed in parallel with the flow of liquid to induce turbulence. A partial obstruction, such as one or more wires, blades or bars, can be positioned at the inlet of the reactor to encourage turbulent flow of liquid through the reactor. The channel openings could generally be appropriately sized for diffracting wave fronts in the liquid. In such approaches, the diffracted wave fronts combine after passing through the openings to encourage turbulent flow of the liquids. As another example, electro-mechanical means can be used to agitate the liquid. The reactor body could be vibrated by, for example, an orbital shaker, linear actuator, or piezo actuator. A magnetic stir bar could be contained inside the reactor body. A rotating magnetic field generated external to the reactor body could then cause the magnetic stir bar to rotate, thereby agitating the liquid inside the reactor body. The magnetic stir bar could be shaped as a cross, ellipse or sphere, and may be fitted with propeller blades to increase agitation. The magnetic stir bar could also be held in a roll cage to prevent it from becoming stuck against the internal walls of the reactor body. As another example, wave fronts can be created in the liquid via the utilization of a pulsed pump or variant obstruction to the fluid flow. Jets, streams, or waves of liquid could thereby be created inside, or directed to, the reactor body. Air bubbles or bubbles of a gas or a mixture of gases could be injected into the liquid to aid mixing or enhance transmission of UV light through the liquid. The reactor body could generally be designed to encourage turbulent flow through the reactor body.

The planar UV light source (e.g, UV light source 105 of FIG. 1) used in combination with the UV reactor bodies disclosed herein can take on various forms. The planar UV light source used with the reactor can be disposed next to, inside or within the reactor body. The planar UV light source may be a planar discharge lamp, a planar excimer UV lamp, a planar micro-plasma UV lamp, an array of UV light emitting diodes, an array of UV laser diodes, or a combination of UV light emitter technologies. In a particular example, the planar UV light source will be a planar KrCl dielectric barrier discharge lamp which emits light with a wavelength of 222 nm. The UV light source may be used in conjunction with phosphors or another medium for down or up conversion of photon energy to produce UV light having the desired spectral content. In addition, the planar UV light source may emit light in two directions, both above and below the defining plane of the planar UV light source. Different reactor bodies are more or less applicable to planar UV light sources that emit light in a single or two directions.

Figure 14:
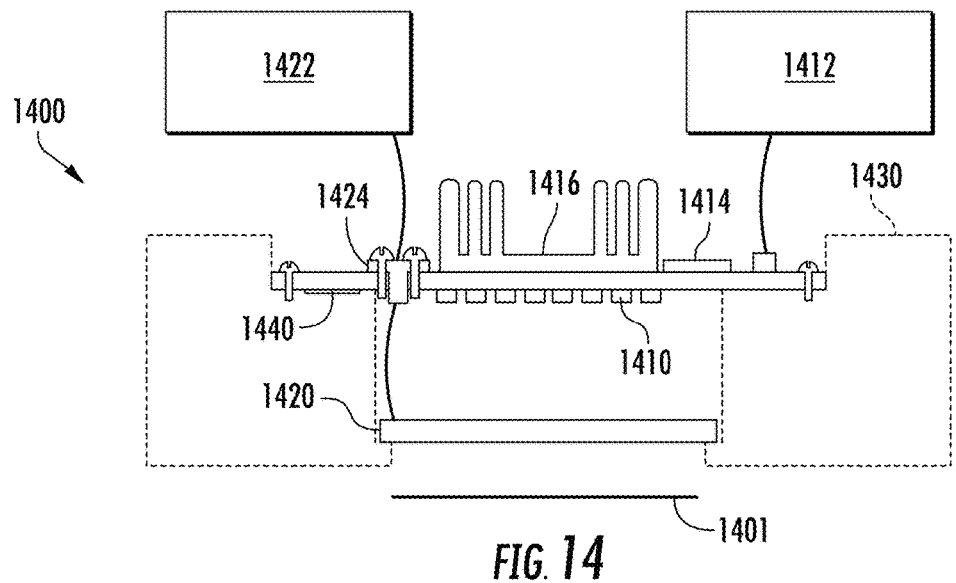
FIG. 14 is a vertical cross-section schematic of a system in which UV light emitting diodes and a dielectric barrier discharge lamp are used in combination as a UV light source.

In a particular example of combining multiple UV emitter technologies shown in FIG. 14, an array of UV light emitting diodes (LED) can be combined with a dielectric barrier discharge (DBD) lamp, so as to increase the UV light irradiance in the plane of the channels. In the DBD-LED combination system 1400 of FIG. 14, an array of UV light emitting diodes 1410 is positioned above the UV transparent material 1401. UV transparent material 1401 represents an irradiance plane in a UV reactor as described herein, and is shown simply as a plane in this figure for clarity. Emission from a planar micro-plasma DBD lamp has characteristics of high intensity and good uniformity close to the lamp surface, which makes it suitable for installation close to the desired irradiance plane. Conversely, light emitted from an LED array has poor uniformity near the plane of the LED array. The uniformity of light emitted from the LED array, as measured in the irradiance plane, improves with increasing distance between the LED array and the irradiance measurement plane. The arrangement of FIG. 14 where the LED array 1410 is spaced further from the irradiance plane of UV transparent material 1401 than the planar discharge lamp 1420 results in uniform illumination in the irradiance plane from the UV planar light source that includes both the planar discharge lamp and the LED array. The dielectric barrier discharge lamp 1420 is partially transparent to light emitted by the array of ultraviolet light emitting diodes 1410. In some approaches, irradiance of light generated by the lamp assembly can be further increased by stacking multiple micro-plasma DBD lamps on top of each other.

The LED array 1410 is run by LED power supply 1412 and LED control circuitry 1414, with a heat sink 1416 shown to provide cooling for the LED array 1410. The dielectric barrier discharge lamp 1420, which is powered by discharge lamp power supply 1422 as routed through electrical feed-through 1424, is positioned between the array of UV light emitting diodes 1410 and the UV transparent material 1401. Supports 1430 maintain the spacing between LED array 1410 and planar discharge lamp 1420. Printed circuit board 1440 assists in operation of the planar discharge lamp 1420.

The dielectric barrier discharge lamp 1420 is constructed mostly from materials such as quartz which have a high transmittance to UV light emitted by the UV light emitting diodes 1410. The positioning of the UV light emitting diode array and the dielectric barrier discharge lamp as shown in FIG. 14 enables light generated by the UV light emitting diode array 1410 to traverse the dielectric barrier discharge lamp 1420 and reach liquid flowing in channels in UV transparent material 1401 (e.g., channels 104 of FIG. 1). Operating the UV light emitting diode array 1410 and the dielectric barrier discharge lamp 1420 simultaneously results in a higher UV light irradiance in the plane of the channels of UV transparent material 1401, compared to operating either light source 1410 or 1420 individually. In one approach the dielectric barrier discharge lamp 1420 is a planar KrCl dielectric barrier discharge lamp which emits light with a wavelength of 222 nm, and the UV light emitting diode array 1410 emits light having a peak intensity of 280 nm. Ultraviolet light from the 280 nm UV light emitting diode array 1410 inactivates microorganisms primarily by damaging DNA. Ultraviolet light from the 222 nm dielectric barrier discharge lamp 1420 increases inactivation rates of UV-resistant microorganisms by damaging proteins.

Figure 15:
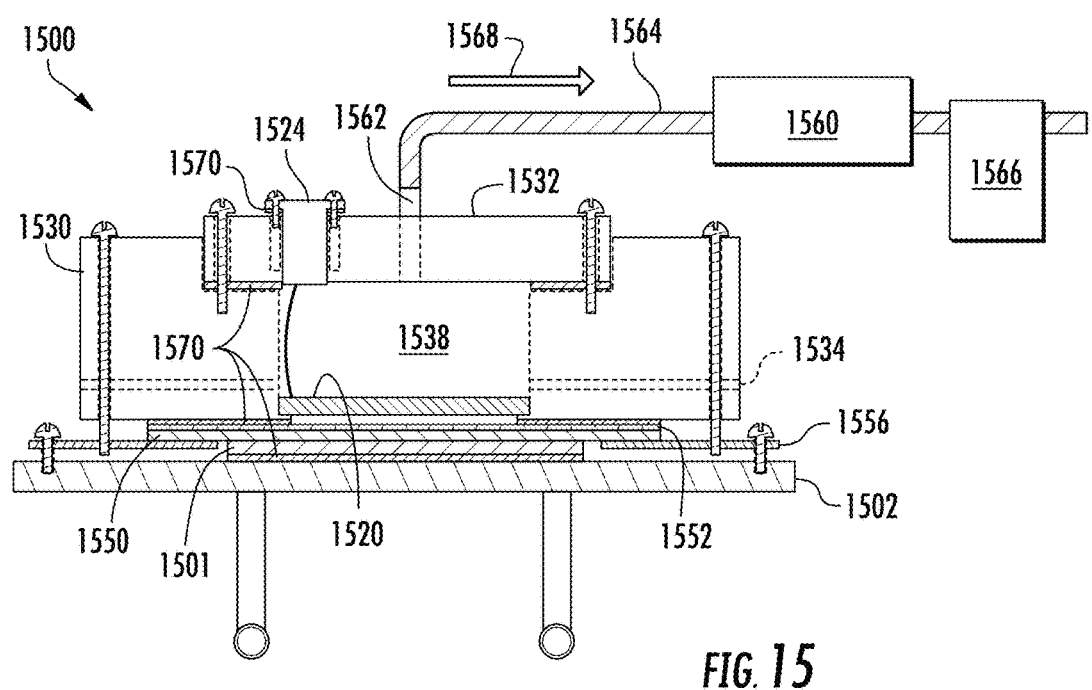
FIG. 15 is a vertical cross-section schematic of a system in which a dielectric barrier discharge lamp is used in combination with phosphor conversion.

FIG. 15 shows an example of using phosphors for photon energy down-conversion of light from a UV lamp. In the DBD-phosphor combination system 1500 of FIG. 15, a planar Xe dielectric barrier discharge lamp 1520, which emits light with a wavelength of 172 nm, can be positioned in close proximity to a quartz plate 1550 coated with a phosphor 1552 that converts the 172 nm light to light of longer wavelengths, with a high proportion of light in the wavelength range 200-300 nm. This approach utilizes the high efficiency of a 172 nm Xe dielectric barrier discharge lamp to produce UV light of wavelengths closer to those of maximum germicidal efficacy. The phosphor-coated quartz plate 1550 is positioned between the 172 nm Xe dielectric barrier discharge lamp 1520 and the UV transparent material 1501 (e.g., quartz), such that the phosphor coating 1552 is positioned close to the 172 nm Xe dielectric barrier discharge lamp 1520. In the embodiment shown, the DBD lamp 1520 is supported by enclosure 1530, and phosphor-coated quartz plate 1550 is held in position between DBD lamp 1520 and UV transparent material 1501 by metal plate 1556. The 172 nm light produced by the Xe dielectric barrier discharge lamp 1520 excites the phosphors of coating 1552, which subsequently emit light, a high proportion of which is in the wavelength range 200-300 nm. The light emitted by the phosphors can pass through the quartz plate 1550 on which they reside with minimal attenuation to reach the liquid in channels within UV transparent material 1501. UV transparent material 1501 is mounted on substrate 1502 of a UV reactor system as described in FIG. 2A and other embodiments herein.

The 172 nm Xe dielectric barrier discharge lamp 1520 and the phosphor-coated quartz plate 1550 can be housed by an enclosure 1530 (similar to support 1430 of FIG. 14) with reflective surfaces such as PTFE or aluminum to increase the UV light irradiance in the plane of channels in UV transparent material 1501. The enclosure 1530 may feature a lid 1532 made of a metal such as aluminum, having a port 1562 through which gases can be pumped in to or out of the enclosure chamber 1538. Unwanted ozone produced by the 172 nm Xe dielectric barrier discharge lamp 1520 can be pumped out of the enclosure 1530 and eliminated by connecting one or more ozone decomposers 1560 to port 1562 on the enclosure with ozone-resistant tubing 1564. A gas pump 1566 is connected in series with the ozone decomposition stage in order to draw air that contains ozone out of the enclosure and into the ozone decomposition stage. The air flow direction for eliminating ozone is indicated by arrow 1568. The enclosure may contain dedicated holes 1534 for increasing air flow through the enclosure which aids in regulating the temperature of lamp 1520. Ports 1534 are shown as through-holes in the support block of enclosure 1530 in this example. Alternatively, a gas such as nitrogen or argon can be pumped into the enclosure through a port in the enclosure to displace oxygen to reduce ozone production. Seals 1570, which can be silicone or other similar materials, are also shown in FIG. 15 for providing gas and air barriers between components. Seals 1570 are illustrated between the UV transparent material 1501 and reactor substrate 1502, between phosphor-coated plate 1550 and the bottom of enclosure 1530, between lid 1532 and an upper surface of enclosure 1530, and between electrical feed-through 1524 and the lid 1532. Electrical feed-through 1524 assists in routing power to discharge lamp 1520.

Figure 8:
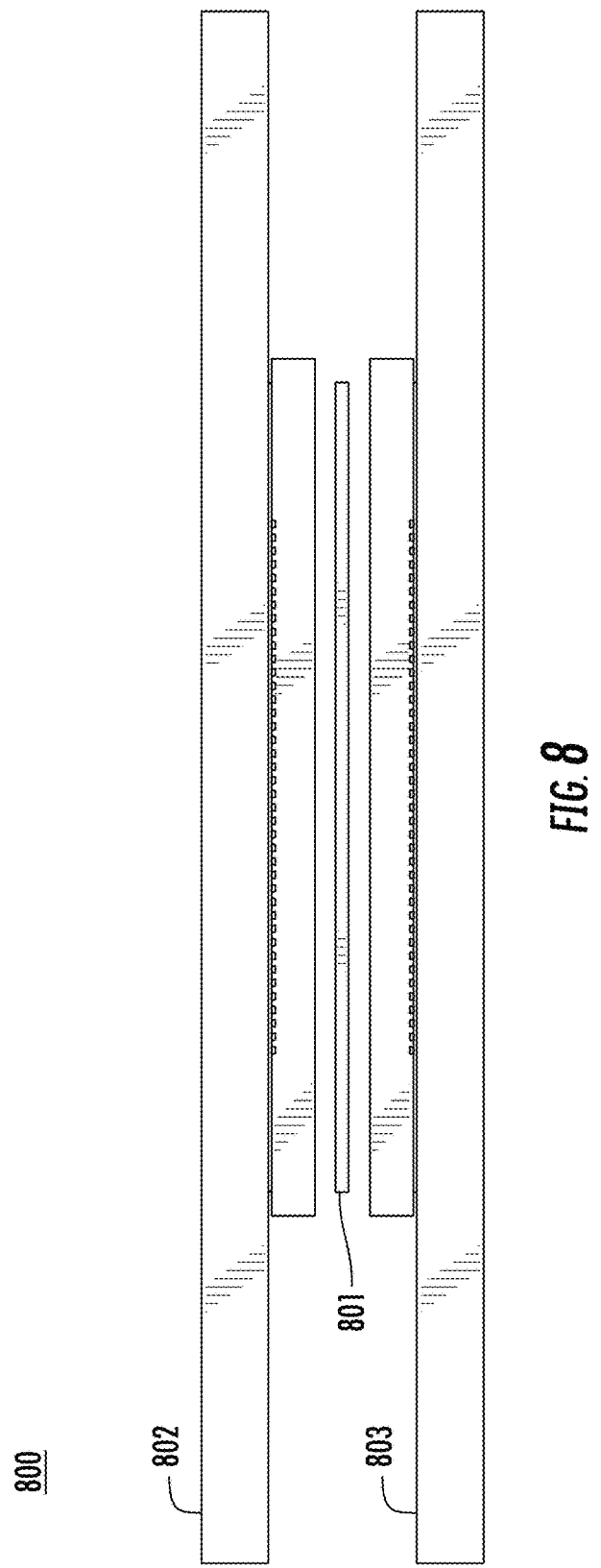
FIG. 8 illustrates an exploded side view of a UV reactor in accordance with embodiments of the present disclosure.

FIG. 8 provides an exploded side view of a UV reactor 800 with a planar UV light source 801 that emits light in both directions from its defining plane. As such, UV reactor 800 is designed such that two sub-bodies 802 and 803 are positioned on either side of planar UV light source 801. Sub-bodies 802 and 803 are each in large part similar to the reactor body of UV reactor 100 except that they will be joined with the other reactor located on the opposite side of planar UV light source 801. The UV reactor designs disclosed herein can be modified in a similar manner to UV reactor 800 such that the reactor body has multiple interior compartments each with at least one UV-transparent window that are located on either side of a planar UV light source that emits light from both sides. For example, UV reactor 400 could essentially be duplicated and aligned on either side of a planar UV light source to produce a reactor with some of the beneficial properties of reactor 800. As seen in UV reactor 800, in the resulting structures, light emitted from one side of the planar UV light source travels though one UV-transparent window into an interior compartment of the reactor body (e.g., sub-body 802 or 803), and light emitted from the other side of the planar UV light travels through a second UV-transparent window into a second interior compartment of the reactor body (e.g., sub-body 803 or 802). In the specific example of UV reactor 800, the windows are transparent slabs of UV-transparent material and the interior compartments are channels formed in those slabs.

In a related alternative, certain UV reactors in accordance with the teachings disclosed herein could include a reactor body with UV-transparent windows on opposite sides of a single interior compartment. For example, a set of channels could be sandwiched between two planar UV light sources bombarding the fluid in the channels with UV light from both sides. In further related embodiments, each planar UV light source in that sandwich could itself be placed between a set of channels to create a repeating pattern of planar sources and channels that are exposed on either side by direct UV light.

The materials used for the reactor substrate and UV-transparent materials can take various forms. For example, the UV-transparent material could comprise or consist essentially of fused silica, quartz, sapphire or AlON. The reactor substrate could comprise or consist essentially of aluminum, stainless steel, or any material capable of offering support to the overall reactor. Additional benefits accrue to those approaches in which the reactor substrate material is reflective to UV light such that additional light paths through the reactor compartments are created.

In certain approaches, the planar UV light source, reactor substrate, and slab of UV-transparent material will be easily disconnected in order to facilitate maintenance such as cleaning the UV-transparent material or replacing the planar UV light source. In accordance with these approaches, certain reactors disclosed herein exhibit designs that make replacement or maintenance of the UV light source easier compared to related approaches. As seen with reference to UV reactor 100, in contrast to certain other approaches, planar UV light source 105 is not surrounded by fluid channels such that there is no need to disrupt any fluid seals in the system in order to replace the UV light source. In the specific example of reactor 100, planar light source 105 only has reactor fluid channels in one direction. In contrast to approaches in which the UV light source is engulfed by fluid channels, planar UV light source 105 can be lifted off of reactor 100 away from the channels, while the fluid channels remain connected to whatever system interfaces with inlet 106 and outlet 107. In the same sense, it is also easy to replace planar UV light source 801 from reactor 800 in that it only has reactor fluid channels in two directions from the light source.

The structure through which the reactor substrate, slab of UV-transparent material, and planar UV light source are combined and held together can be provided to facilitate easy disassembly for cleaning and maintenance of the reactor. Structures can also be provided to facilitate easily and quickly disconnecting the reactor from, and reconnected it to, the pumping system. For example, clamps can be provided that press the planar light source, slab of UV-transparent material, and reactor substrate together. Quick and easy connection and disconnection can be achieved by joining the reactor to the pumping system using flange clamps, quick-connect fittings, or another fast-sealing mechanism for fluid transfer lines.

Figure 9:
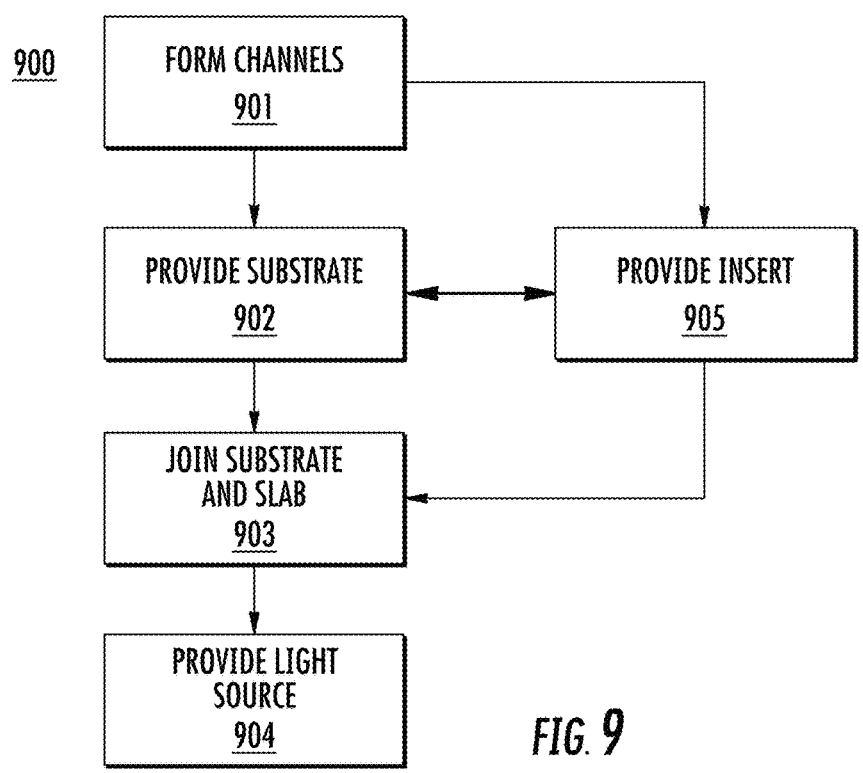
FIG. 9 illustrates a flow chart for a set of methods for assembling UV reactors that are in accordance with embodiments of the present disclosure.

FIG. 9 includes flow chart 900 which illustrates a set of methods for fabricating the UV reactors disclosed herein. Step 901 involves forming a set of parallel channels. Step 901 could involve forming those channels in a slab of UV-transparent material. For example, channels could be carved into a slab of quartz. The channels could be formed by performing a masked wet chemical or plasma etch of the UV-transparent material, or by laser ablation. Alternatively step 901 could involve forming the set of parallel channels in the reactor substrate. For example, the channels could be carved into a stainless steel reactor. The channels could be formed by a machining or molding process. Step 901 could alternatively involve forming the set of channels in both the slab of UV-transparent material and the reactor substrate where the overall shape of the channels was defined by a combination of the two formation processes.

Flow chart 900 also includes step 902. Step 902 involves providing a reactor substrate with an input manifold and an output manifold. In certain implementations, the reactor substrate will be the substrate in which the channels were formed in step 901. In other approaches, the reactor substrate will be a bare homogenous substrate, as in substrate 102, with the exception of manifolds such as inlet manifold 108 and outlet manifold 109 for connection to inlet 106 an outlet 107. Alternatively, the manifolds could include a section carved into the homogenous substrate as well as additional structures joined to the substrate as in substrate 102.

Flow chart 900 also includes step 903. Step 903 involves joining the slab of UV transparent material and the reactor substrate. This step can be conducted so as to form a temporary connection such as through the use of clamps or other means that provide a mechanically reversible connection. This step can also be conducted so as to form a more permanent connection such as through the use of adhesives or welding. In certain approaches the UV reactor is formed by bringing the two parts into contact, where the parts are shaped to create voids which allow the flow of liquid through the reactor, when the parts are in contact. The voids could be the channels formed in step 901. After joining step 903, the input manifold and output manifold from step 902, and the set of parallel channels from step 901 are in fluid communication. The process also comprises providing a planar UV light source isolated from the set of parallel channels by the shaped slab of UV-transparent material. The set of parallel channels and a defining plane of the planar ultraviolet light source are parallel in the assembled ultraviolet reactor.

Flow chart 900 also includes step 904. Step 904 involves providing a planar UV light source. The planar UV light source can be positioned in, on, or near the joined substrate and UV-transparent slab. The planar UV light source can be connected to the joined substrate and UV-transparent slab to form a complete UV reactor. The planar UV light source can take any of the forms described above. The UV light source can be connected to the UV-transparent slab using a clamping means. The UV light source can be mounted in an enclosure which is connected to the UV-transparent slab using clamping means. The UV light source can be placed in fixed relationship to reactor body through the use of a chassis.

Flow chart 900 can also include step 905. Step 905 involves providing a flexible insert. The flexible insert can be positioned between the substrate and UV-transparent slab. After the joining step, the flexible insert can be in contact with both the substrate and the UV-transparent material. If the channels are formed, or partly formed, by excavated portions of the flexible insert, step 905 can be preceded by forming those excavated regions in the flexible insert.

Figure 10:
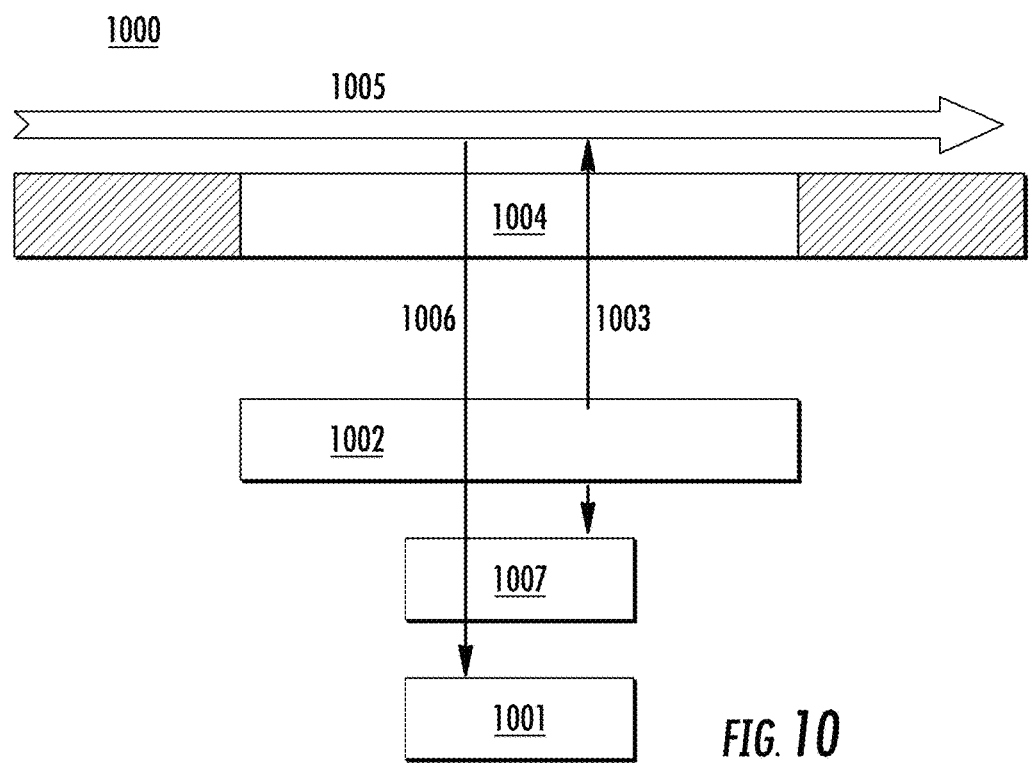
FIG. 10 illustrates a block diagram of a side view of a UV reactor with an integrated photodetector that is in accordance with embodiments of the present disclosure.

FIG. 10 includes a block diagram of a side view of a UV reactor 1000 with an integrated photodetector 1001. Photodetector 1001 is a light-sensitive device such as a spectrometer, photodiode, CCD array or photomultiplier tube. As illustrated, UV reactor 1000 includes planar UV light source 1002 emitting UV light 1003 in two directions. The planar UV light source 1002 is transparent to UV light. The UV light passes through a UV transparent window 1004 and bombards liquid 1005. Light emitted by luminescence travels back along light path 1006. The light passes through filter 1007 and hits the photodetector 1001. The disclosed configuration allows the photodetector 1001 to determine the purity of the liquid, and therefore the efficacy of the UV reactor, as described below.

The presence of certain bacteria and other impurities in liquid 1005 causes variation in the characteristics of light 1006 emitted from within the liquid 1005 after it has been bombarded with UV light 1003. In particular, certain bacteria fluoresce upon exposure to UV light according to a predictable and identifiable spectrum. The original spectrum of UV light could be filtered out to allow a photodetector to analyze the emitted light for this identifiable spectrum. As shown in UV reactor 1000, the UV light source could emit light 1003, the filter 1007 would then be designed to filter out electromagnetic radiation from planar UV light source 1002 such that light 1006 passed through to photodetector 1001 alone. As a result, fluorescence from bacteria or protein excited by light 1003 in liquid 1005 follows path 1006 through planar UV light source 1002, and then through filter 1007 which rejects light 1003 and allows the fluorescence from the bacteria (path 1006) to pass through to photodetector 1001 located behind the filter. That is, the UV reactor 1000 may include a bandpass filter positioned to receive an emitted photon that originated in the liquid, after absorption of a photon from the planar ultraviolet light source, and which traversed at least one channel in the set of parallel channels, where a photodetector located on an opposite side of the bandpass filter from the set of parallel channels receives the reflected photon after it has passed through the bandpass filter.

An example application of the sensor configuration in FIG. 10 is application of a 222 nm lamp to excite fluorescence from the Tryptophan amino acid at 340 nm. The 340 nm luminescence signal is typical of bacteria such as *Escherichia Coli*. A filter 1007 placed behind the UV lamp will block the 222 nm light from the lamp, but allow the 340 nm bacteria luminescence through to photodetector 1001. This approach is well-suited to bacteria detection in water. Liquids naturally high in the Tryptophan amino acid, such as milk, are not suited to this method of bacteria detection but the method can be applied for protein monitoring applications instead.

Figure 11:
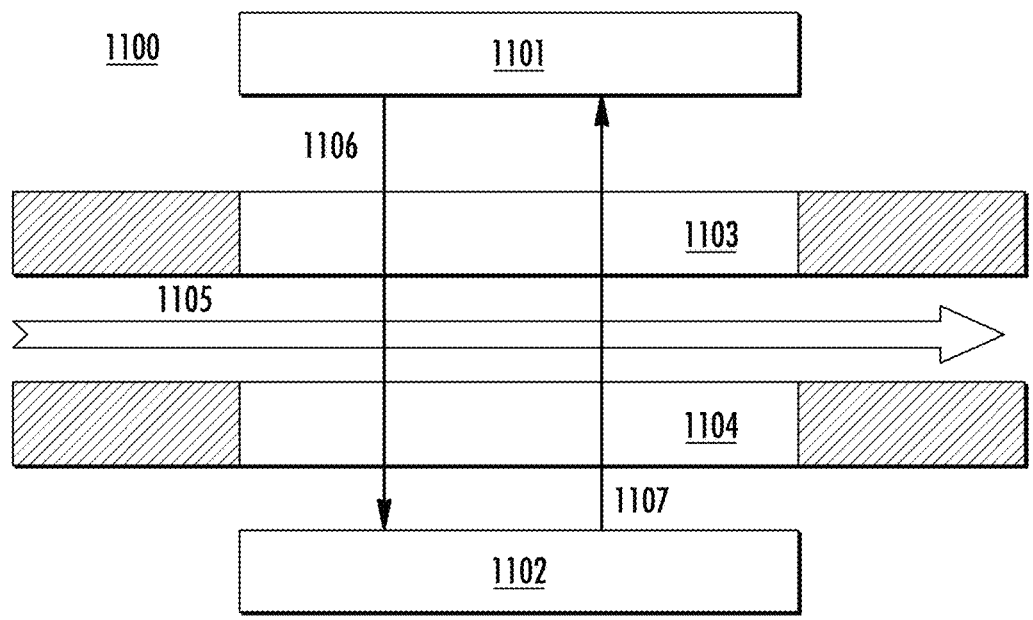
FIG. 11 illustrates a block diagram of a side view of a UV reactor with an intrinsic UV-light efficacy sensor that is in accordance with embodiments of the present disclosure.

FIG. 11 includes a block diagram of a side view of a UV reactor 1100 with two planar UV light sources 1101 and 1102. As in FIG. 10, both light sources bombard a fluid through UV-transparent windows 1103 and 1104. Fluid flow 1105 is thereby bombarded from two directions via light paths 1106 and 1107. The configuration exhibited by UV reactor 1100 also allows the planar light sources to sense the operation of the other. As detection and emission of light are reversible processes for certain UV light sources, and any planar UV light source can be augmented with the ability to detect UV light, the operating mode of either light can be switched from light generation to light detection to monitor the efficacy of the alternative light source. In addition, in certain approaches the light source will be able to detect the emission signature of fluorescence from liquid 1105 as it is exposed to UV light from the alternative light source. These approaches may involve temporarily inserting a filter between the planar light source and the transparent window to screen the UV light generated by the alternative light source from the fluorescence.

Figure 12:
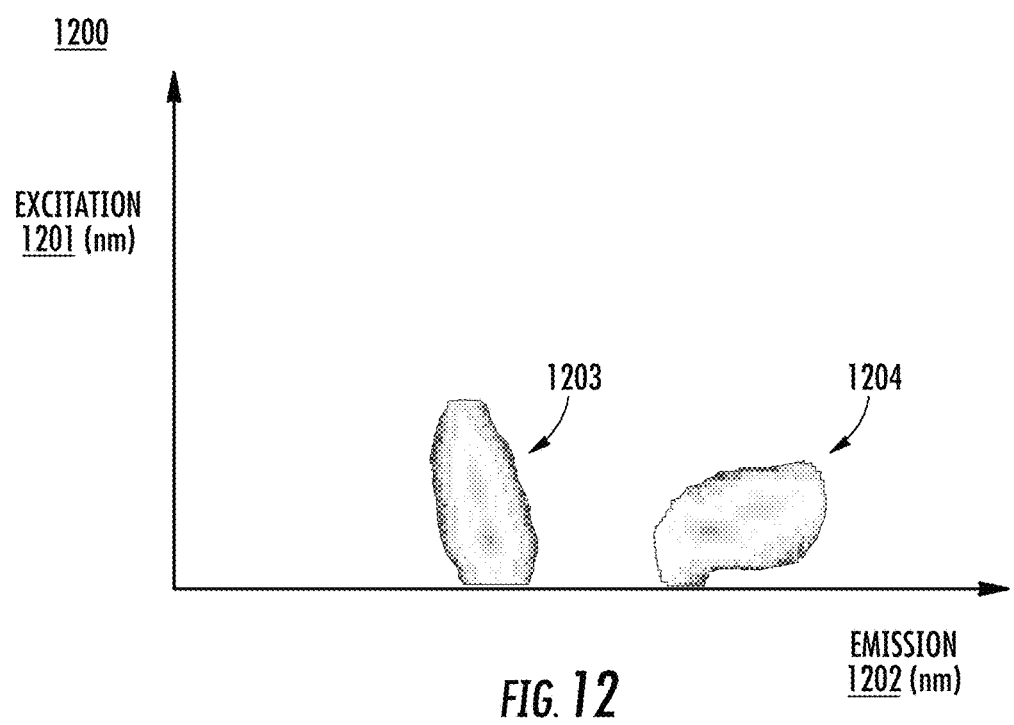
FIG. 12 illustrates a topographic plot of the energy of fluorescence of a sample of fluid in joules where the ordinate is the wavelength of light emitted by the sample in nanometers and the abscissa is the wavelength of light applied to the sample in nanometers.

FIG. 12 illustrates a topographic plot 1200 of the energy of fluorescence of a sample of fluid in joules where the abscissa 1202 is the wavelength of light emitted by the sample in nanometers and the ordinate 1201 is the wavelength of light applied to the sample in nanometers. In accordance with approaches similar to those described with reference to FIGS. 10 and 11, a given excitation energy provided by the planar UV light source on axis 1201 will result in excitation of microorganisms or other impurities in the liquid that produce an excitation pattern with an intensity provided by the topography of the plot at a wavelength on axis 1202. Plot 1200 displays two fluorescence signatures 1203 and 1204 responding to roughly the same excitation. As such, plot 1200 gives an example of how more than one impurity can be screened for given a single excitation.

The information gleaned from sensors in the UV reactor can be used to modify the operation of the UV reactor of which they are a part. For example, identifying the presence of a bacteria or other impurity at harmful levels could be used to alter the speed at which fluid flows through the reactor, trigger fluid to recirculate through the reactor or alter the amount of recirculation already being conducted, or simply shutdown the reactor. Alternatively, the information could be presented to an operator in real time or trigger an alarm to allow the operator to determine what action to take.

The reactors disclosed herein can be augmented and operated in order to operate with minimal power requirements. As mentioned previously, the reactors can be configured to utilize gravity in order to force liquid through the reactor body, and the loss in potential energy of the fluid can be transferred into electrical energy to power the UV light source or turbulence-inducing features, if they are present. The UV light source, any turbulence-inducing features, any pumping means, and the control circuitry for the UV reactor could also be powered via solar cells that are built into the UV reactor. Those same features could also be powered via batteries such that the UV reactor can operate without access to a utility grid.

Figure 13:
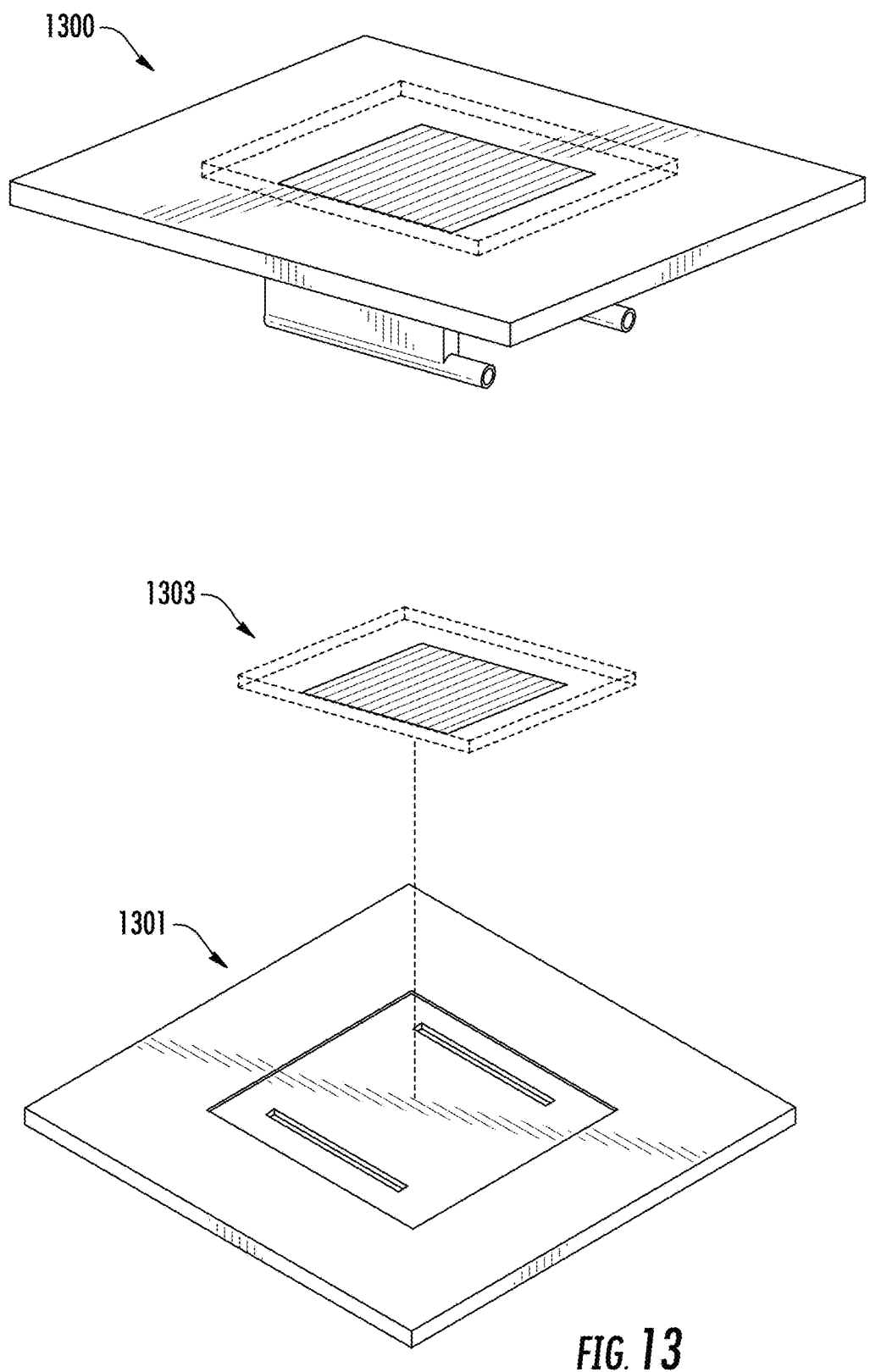
FIG. 13 illustrates multiple angled views of another UV reactor in accordance with embodiments of the present disclosure.

FIG. 13 illustrates a particular example of a combination of approaches that are described above. UV reactor 1300 includes a reactor substrate 1301 and shaped UV-transparent material 1303. In FIG. 13, the UV reactor 1300 is shown in both full and exploded forms. The channels in UV reactor 1300 are defined by excavated portions of UV-transparent material 1303, and the interface with reactor substrate 1301. UV reactor substrate 1301 presents flat interfaces towards the channels of the reactor. Similarly, numerous combinations of channel shapes and profiles can be defined using numerous combinations of the reactor. For example, the UV-transparent material could be shaped to create a single meandering channel while the substrate presented flat interfaces towards the channels of the reactor.

While the specification has been described in detail with respect to specific embodiments of the invention, it will be appreciated that those skilled in the art, upon attaining an understanding of the foregoing, may readily conceive of alterations to, variations of, and equivalents to these embodiments. Additional purification techniques can be used in combination with the UV bombardment to enhance the efficacy of the disclosed UV reactors. For example, other forms of applied treatment such as ultra-sound, pressure, heat, pulsed light, static electric fields, pulsed electric fields, microfiltration, microwaves, ozonation, cold plasma treatment, carbon dioxide, gamma radiation or beta radiation could be applied in combination with the reactors disclosed herein. As another example, different filters could be positioned in line with the flowing liquid such as a quartz glass sponge, activated carbon, or a fabric membrane. In one particular approach, the heat generated by operating the planar UV light source could be used to treat the liquid flowing through the UV reactor. Multiple copies of the reactor bodies disclosed herein could be used in combination accompanied by multiple UV light sources. The light sources and additional reactors could be connected in series or parallel to create a network of reactors, thereby creating a fluid treatment system with increased capacity. These and other modifications and variations to the present invention may be practiced by those skilled in the art, without departing from the scope of the present invention, which is more particularly set forth in the appended claims.

What is claimed is:

1. An ultraviolet reactor comprising:
a shaped slab of ultraviolet-transparent material;
a reactor substrate in contact with the shaped slab;
a set of parallel channels defined by an interface between the shaped slab and the reactor substrate;
an input manifold and an output manifold joined to a surface of the reactor substrate, the surface being opposite of the interface between the shaped slab and the reactor substrate; and
a planar ultraviolet light source isolated from the set of parallel channels by the shaped slab of ultraviolet-transparent material;
wherein the set of parallel channels and a defining plane of the planar ultraviolet light source are parallel.

2. The ultraviolet reactor of claim 1 wherein:
the interface between the shaped slab and the reactor substrate consists of a single flat reactor substrate surface and excavated regions of the shaped slab of ultraviolet-transparent material; and
the excavated regions solely define an ultraviolet exposure area of the set of parallel channels.

3. The ultraviolet reactor of claim 1 further comprising:
a bandpass filter positioned to receive an emitted photon that originated in a liquid in the set of parallel channels, after absorption of a photon from the planar ultraviolet light source, and which traversed at least one channel in the set of parallel channels; and
a photodetector located on an opposite side of the bandpass filter from the set of parallel channels to receive a reflected photon after it has passed through the bandpass filter.

4. The ultraviolet reactor of claim 1 wherein:
the planar ultraviolet light source comprises an array of ultraviolet light emitting diodes and a dielectric barrier discharge lamp;
the dielectric barrier discharge lamp is partially transparent to light emitted by the array of ultraviolet light emitting diodes; and
the dielectric barrier discharge lamp is positioned between the shaped slab of ultraviolet-transparent material and the array of ultraviolet light emitting diodes.

5. A process for fabricating an ultraviolet reactor comprising:
forming a set of parallel channels in a slab of ultraviolet-transparent material;
providing a reactor substrate with an input manifold and an output manifold at a first surface of the reactor substrate;
joining the slab of ultraviolet-transparent material and the reactor substrate at a second surface of the reactor substrate, the second surface being opposite the first surface, wherein the input manifold, the output manifold, and the set of parallel channels are in fluid communication after the joining step; and
providing a planar ultraviolet light source isolated from the set of parallel channels by the slab of ultraviolet-transparent material;
wherein the set of parallel channels and a defining plane of the planar ultraviolet light source are parallel in the fabricated ultraviolet reactor.

6. The process of claim 5, further comprising:
providing a flexible insert on the reactor substrate;
wherein the flexible insert is in contact with the slab of ultraviolet-transparent material after the joining step; and
wherein the flexible insert is in contact with the second surface of the reactor substrate after the joining step.

7. An ultraviolet reactor comprising:
a shaped slab of ultraviolet-transparent material;
a reactor substrate;
a patterned flexible insert positioned between, and in contact with, the shaped slab and the reactor substrate;

a set of parallel channels defined by interfaces between the shaped slab, the patterned flexible insert, and the reactor substrate; and
a planar ultraviolet light source isolated from the set of parallel channels by the shaped slab of ultraviolet-transparent material;
wherein the set of parallel channels and a defining plane of the planar ultraviolet light source are parallel.

8. The ultraviolet reactor of claim 7:
wherein the planar ultraviolet light source emits a photon to be absorbed by a liquid flowing in the set of parallel channels; and
the ultraviolet reactor further comprises:
a bandpass filter positioned to receive an emitted photon that originated in the liquid, after absorption of the photon from the planar ultraviolet light source, and which traversed at least one channel in the set of parallel channels; and
a photodetector located on an opposite side of the bandpass filter from the set of parallel channels to receive a reflected photon after it has passed through the bandpass filter.

9. The ultraviolet reactor of claim 7 wherein:
the planar ultraviolet light source comprises an array of ultraviolet light emitting diodes and a dielectric barrier discharge lamp;
the dielectric barrier discharge lamp is partially transparent to light emitted by the array of ultraviolet light emitting diodes; and
the dielectric barrier discharge lamp is positioned between the shaped slab of ultraviolet-transparent material and the array of ultraviolet light emitting diodes.

10. An ultraviolet reactor comprising:
a shaped slab of ultraviolet-transparent material;
a reactor substrate;
a flexible insert positioned between, and in contact with, the shaped slab and the reactor substrate;
a set of parallel channels defined by an interface between the flexible insert and the shaped slab;
an input manifold and an output manifold joined to a first surface of the reactor substrate, the first surface being opposite of a second surface of the reactor substrate that is in contact with the flexible insert; and
a planar ultraviolet light source isolated from the set of parallel channels by the shaped slab of ultraviolet-transparent material;
wherein:
the set of parallel channels and a defining plane of the planar ultraviolet light source are parallel;
the interface between the shaped slab and the flexible insert consists of a single flat flexible insert surface and excavated regions of the shaped slab of ultraviolet-transparent material; and
the excavated regions solely define an ultraviolet exposure area of the set of parallel channels.

11. The ultraviolet reactor of claim 10:
wherein the planar ultraviolet light source emits a photon to be absorbed by a liquid flowing in the set of parallel channels; and
the ultraviolet reactor further comprises:
a bandpass filter positioned to receive an emitted photon that originated in the liquid, after absorption of a photon from the planar ultraviolet light source, and which traversed at least one channel in the set of parallel channels; and
a photodetector located on an opposite side of the bandpass filter from the set of parallel channels to receive a reflected photon after it has passed through the bandpass filter.

12. The ultraviolet reactor of claim 10 wherein:
the planar ultraviolet light source comprises an array of ultraviolet light emitting diodes and a dielectric barrier discharge lamp;
the dielectric barrier discharge lamp is partially transparent to light emitted by the array of ultraviolet light emitting diodes; and
the dielectric barrier discharge lamp is positioned between the shaped slab of ultraviolet-transparent material and the array of ultraviolet light emitting diodes.

\* \* \* \* \*